(12) United States Patent
Hartmann

(10) Patent No.: US 12,228,399 B2
(45) Date of Patent: Feb. 18, 2025

(54) HETERODYNE LIGHT SOURCE FOR USE IN METROLOGY SYSTEM

(71) Applicant: Mitutoyo Corporation, Kanagawa-ken (JP)

(72) Inventor: Nick Hartmann, Newcastle, WA (US)

(73) Assignee: Mitutoyo Corporation, Kanagawa-ken (JP)

(*) Notice: Subject to any disclaimer, the term of this patent is extended or adjusted under 35 U.S.C. 154(b) by 483 days.

(21) Appl. No.: 17/460,993

(22) Filed: Aug. 30, 2021

(65) Prior Publication Data
US 2023/0062525 A1  Mar. 2, 2023

(51) Int. Cl.
G01B 9/02003 (2022.01)
G01B 9/02001 (2022.01)

(52) U.S. Cl.
CPC ..... G01B 9/02003 (2013.01); G01B 9/02007 (2013.01); G01B 2290/70 (2013.01)

(58) Field of Classification Search
None
See application file for complete search history.

(56) References Cited

U.S. PATENT DOCUMENTS

| | | | | |
|---|---|---|---|---|
| 3,783,185 A | * | 1/1974 | Spaulding | G02F 1/11 348/769 |
| 5,485,272 A | * | 1/1996 | Dirksen | G02F 1/33 356/487 |
| 5,946,147 A | * | 8/1999 | Tanaka | G03B 13/08 359/836 |
| 6,236,507 B1 | | 5/2001 | Hill et al. | |
| 7,030,994 B2 | * | 4/2006 | Hill | G01B 9/02059 356/482 |

(Continued)

FOREIGN PATENT DOCUMENTS

CN  102570273 A  7/2012
WO  2020/128423 A1  6/2020

OTHER PUBLICATIONS

Cai et al., "Generalized phase-shifting interferometry with arbitrary unknown phase steps for diffraction objects," *Optics Letters*, vol. 29, No. 2, pp. 183-185, 2004.

(Continued)

*Primary Examiner* — Violeta A Prieto
(74) *Attorney, Agent, or Firm* — Seed IP Law Group LLP

(57) ABSTRACT

A metrology system including a heterodyne light source is provided. The heterodyne light source includes a first light source, an acousto-optic modulator and a source optical arrangement. The acousto-optic modulator receives at least one wavelength laser beam from the first light source and generates at least one corresponding frequency shifted laser beam (e.g., with orthogonal polarization). The source optical arrangement includes a receiving optical element portion and a birefringent optical element portion. The receiving optical element portion receives the wavelength laser beam(s) and the corresponding frequency shifted laser beam(s) and directs the beams along an optical path toward the birefringent optical element portion. The birefringent optical element portion combines the beams to output a combined beam (e.g., which may be utilized as part of a measurement process to determine at least one measurement distance to at least one surface point on a workpiece, etc.).

19 Claims, 16 Drawing Sheets

(56) References Cited

U.S. PATENT DOCUMENTS

| | | | | |
|---|---|---|---|---|
| 7,365,857 | B2* | 4/2008 | Holmes | G01B 9/02058 356/487 |
| 7,375,819 | B2* | 5/2008 | Courville | G02F 1/332 359/311 |
| 7,564,568 | B2 | 7/2009 | De Groot et al. | |
| 10,883,816 | B2* | 1/2021 | Jansen | G01B 9/02029 |
| 2006/0001887 | A1* | 1/2006 | Ranalli | G03F 7/70775 356/492 |
| 2006/0087657 | A1* | 4/2006 | Holmes | G01B 9/02003 356/487 |
| 2007/0097376 | A1* | 5/2007 | Courville | G01B 9/02003 356/487 |
| 2010/0134801 | A1* | 6/2010 | Millerd | G01B 9/02065 356/492 |
| 2012/0194824 | A1* | 8/2012 | de Groot | G01B 9/02003 356/482 |
| 2020/0003765 | A1* | 1/2020 | Chowdhury | G01N 33/582 |
| 2020/0191552 | A1* | 6/2020 | Jansen | G01B 9/02029 |
| 2023/0008139 | A1* | 1/2023 | Swillam | G03F 9/7069 |
| 2023/0213610 | A1* | 7/2023 | Eberspach | G06V 40/166 |
| 2023/0236125 | A1* | 7/2023 | Millerd | G01N 21/21 356/491 |

OTHER PUBLICATIONS

Dahlquist et al., "Zeeman Laser Interferometer," *Applied Physics Letters*, vol. 9, pp. 181-183, 1966.

Ehrlich et al., "Voltage-controlled acousto-optic phase shifter," *Review of Scientific Instruments*, vol. 59, No. 11, pp. 2390-2392, 1988.

Ferraro et al., "Extended focused image in microscopy by digital holography," *Optics Express*, vol. 13, No. 18, pp. 6738-6749, 2005.

Fratz et al., "Inline application of digital holography," *Applied Optics*, vol. 58, No. 34, pp. G120-G126, 2019.

Gass et al., "Phase imaging without $2\pi$ ambiguity by multiwavelength digital holography," *Optics Letters*, vol. 28, No. 13., pp. 1141-1143, 2003.

Hsu, Cheng-Chih, "The Applications of the Heterodyne Interferoemetry," *Interferometry—Research and Applications in Science and Technology*, InTech, pp. 31-64, 2012.

Lin et al., "Color correction for chromatic distortion in a multi-wavelength digital holographic system.," *Journal of Optics*, vol. 13, pp. 1-11, 2011.

Liu et al., "Hierarchical phase unwrapping for dual-wavelength digital holographic microscopy," *Journal of Optics*, 10 pages, 2020.

Mann, et al. "Quantitative phase imaging by three-wavelength digital holography," *Optics Express*, vol. 16, No. 13, pp. 9753-9764, 2008.

Marrugo et al., "State-of-the-art active optical techniques for three-dimensional surface metrology: a review," *Journal of the Optical Society of America*, vol. 37, No. 9, pp. B60-B77, 2020.

Wada et al., "Large step-height measurements using multiple-wavelength holographic interferometry with tunable laser diodes," *J. Opt. Soc. Am. A*, vol. 25, No. 12, pp. 3013-3020, 2008.

Zaidi et al., "Wavelength-Demultiplexed Laser Interferometry for Metrology," *IEEE Photonics Journal*, pp. 1-10, 2020.

* cited by examiner

| TOF-1 $\lambda_1 = 500$ nm $\varphi_1$ (deg) | TOF-2 $\lambda_2 = 800$ nm $\varphi_2$ (deg) | TOF-3 $\lambda_3 = 1000$ nm $\varphi_3$ (deg) | Surface Height $\Delta z$ ($\mu$m) |
|---|---|---|---|
| 0 | 0 | 0 | 0.0 |
| 144 | 90 | 72 | 0.1 |
| 288 | 180 | 144 | 0.2 |
| 72 | 270 | 216 | 0.3 |
| 216 | 0 | 288 | 0.4 |
| 0 | 90 | 0 | 0.5 |
| 144 | 180 | 72 | 0.6 |
| 288 | 270 | 144 | 0.7 |
| 72 | 0 | 216 | 0.8 |
| 216 | 90 | 288 | 0.9 |
| 0 | 180 | 0 | 1.0 |
| 144 | 270 | 72 | 1.1 |
| 288 | 0 | 144 | 1.2 |
| 72 | 90 | 216 | 1.3 |
| 216 | 180 | 288 | 1.4 |
| 0 | 270 | 0 | 1.5 |
| 144 | 0 | 72 | 1.6 |
| 288 | 90 | 144 | 1.7 |
| 72 | 180 | 216 | 1.8 |
| 216 | 270 | 288 | 1.9 |
| 0 | 0 | 0 | 2.0 |

*FIG.4*

HETERODYNE LIGHT SOURCE FOR USE IN METROLOGY SYSTEM

BACKGROUND

Technical Field

This disclosure relates to precision metrology, and more particularly to precision workpiece surface measurement devices and systems.

Description of the Related Art

Quality control of objects (e.g., workpieces) that include specific surface profiles (e.g., produced by molding and/or machining, or the like), is becoming increasingly demanding in terms or throughput, measurement resolution, and accuracy. Such workpieces may include, but are not limited to, optical components, electronic components, miniature mechanical components, etc. Ideally, such workpieces should be measured/inspected to ensure proper dimensions, function, etc. However, sub-micron level, or even sub-nanometer level, measurement tolerances may be required in order to confirm a workpiece surface with desired characteristics for some applications.

Various precision metrology systems may be used for workpiece surface measurements and inspection. For example, in some instances a metrology system that performs such operations may utilize digital holography (e.g., for which a camera may be utilized to acquire holograms which are processed to determine measurements, etc.). An important part of such systems and/or other comparable measurement systems is a light source that is utilized to illuminate a workpiece that is being measured (e.g., for which an inaccurate or inconsistent light source may result in inaccurate measurements, etc.). The signal-to-noise ratio of such systems is also an important factor (e.g., for which lower ratios may result in less accurate measurements). Configurations that may improve or otherwise enhance such metrology systems (e.g., for measuring and inspecting surfaces of workpieces, etc.) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A metrology system including a heterodyne light source is provided. The heterodyne light source includes a first light source, an acousto-optic modulator and a source optical arrangement. The first light source provides at least a first wavelength laser beam at a first frequency. The acousto-optic modulator is configured to receive the first wavelength laser beam and generate a corresponding first frequency shifted laser beam with a polarization that is rotated (e.g., to be orthogonal) relative to a polarization of the first wavelength laser beam. The source optical arrangement receives and combines the first wavelength laser beam and the first frequency shifted laser beam from the acousto-optic modulator and outputs a corresponding first combined beam. The source optical arrangement includes a receiving optical element portion and a birefringent optical element portion. The receiving optical element portion is configured to receive the first wavelength laser beam and the first frequency shifted laser beam and to direct the beams along an optical path toward the birefringent optical element portion. The birefringent optical element portion is configured to receive the first wavelength laser beam and the first frequency shifted laser beam and combine the beams to output the corresponding first combined beam.

In various implementations, the metrology system further includes a processing portion, wherein the first combined beam is utilized as part of a measurement process for which the processing portion determines at least one measurement distance to at least one surface point on a workpiece. In various implementations, the metrology system further includes a measurement optical arrangement and a sensor arrangement. The measurement optical arrangement is configured to receive the first combined beam and to utilize the first combined beam for providing an optical arrangement output that is related to the distance to the at least one surface point on the workpiece. The sensor arrangement is configured to receive the optical arrangement output and to produce a corresponding sensor arrangement output. The processing portion receives the sensor arrangement output and utilizes the sensor arrangement output as part of the measurement process to determine the least one measurement distance to the at least one surface point on the workpiece.

In various implementations, the source optical arrangement including the receiving optical element portion and the birefringent optical element portion is arranged as an inline optical arrangement. In accordance with the inline optical arrangement, the first wavelength laser beam and the first frequency shifted laser beam (e.g., which are orthogonally polarized) each travel through a same set of components in the heterodyne light source. For example, the same set of components in the inline optical arrangement may include a same receiving optical element of the receiving optical element portion and a same birefringent optical element of the birefringent optical element portion, with the birefringent optical element combining the orthogonally polarized first wavelength laser beam and first frequency shifted laser beam into the first combined beam.

In various implementations, the receiving optical element portion includes an imaging lens. In various implementations, an object plane in the acousto-optic modulator is imaged by the imaging lens into the birefringent optical element portion with a magnification that is matched to the separation angles of both the acousto-optic modulator and the birefringent optical element portion.

In various implementations, the first light source is a multiwavelength light source (e.g., a multiwavelength laser light source) that provides at least a second wavelength laser beam at a second frequency. In such an implementation, the acousto-optic modulator may be configured to receive the second wavelength laser beam and generate a corresponding second frequency shifted laser beam with a polarization that is rotated (e.g., that is orthogonal) relative to a polarization of the second wavelength laser beam. The source optical arrangement may receive and combine the second wavelength laser beam and the second frequency shifted laser beam from the acousto-optic modulator and may output a corresponding second combined beam. The receiving optical element portion may be configured to receive the second wavelength laser beam and the second frequency shifted laser beam and to direct the beams along the optical path toward the birefringent optical element portion. The birefringent optical element portion may be configured to receive the second wavelength laser beam and the second frequency shifted laser beam and to combine the beams to output the corresponding second combined beam with the first combined beam (e.g., for which the first and second combined beams may co-propagate and/or be part of a total combined beam that is provided by the heterodyne light source). In various implementations, the receiving optical element portion comprises a plurality of imaging lenses forming a chromatic imaging system, for which the object plane in the acousto-optic modulator is imaged into the birefringent optical element portion with a magnification that is matched to the separation angles of both the acousto-optic modulator and the birefringent optical element portion for both the first and second wavelengths of the first and second wavelength laser beams, respectively.

In various implementations, the receiving optical element portion comprises a prism. In various implementations, the birefringent optical element portion comprises at least one of a birefringent beam displacer, a Wollaston prism, or a Rochon prism.

A method is provided for operating a metrology system including a heterodyne light source. The method includes operating a first light source of the heterodyne light source, operating an acousto-optic modulator of the heterodyne light source, and determining at least one measurement distance to at least one surface point on a workpiece. The first light source is operated to provide at least a first wavelength laser beam at a first frequency. The acousto-optic modulator is operated to receive the first wavelength laser beam and generate a corresponding first frequency shifted laser beam with a polarization that is rotated relative to a polarization of the first wavelength laser beam. A source optical arrangement receives and combines the first wavelength laser beam and the first frequency shifted laser beam from the acousto-optic modulator and outputs a corresponding first combined beam. The source optical arrangement includes a receiving optical element portion and a birefringent optical element portion. The receiving optical element portion receives the first wavelength laser beam and the first frequency shifted laser beam and directs the beams along an optical path toward the birefringent optical element portion. The birefringent optical element portion receives the first wavelength laser beam and the first frequency shifted laser beam and combines the beams to output the corresponding first combined beam. The determining of the at least one measurement distance to the at least one surface point on the workpiece is based on a measurement process which utilizes the first combined beam.

In various implementations, the method further includes operating a sensor arrangement which is configured to receive an optical arrangement output and to produce a corresponding sensor arrangement output. The optical arrangement output is provided by a measurement optical arrangement which is configured to receive the first combined beam and to utilize the first combined beam for providing the optical arrangement output that is related to the distance to the at least one surface point on the workpiece. The determination of the at least one measurement distance to the at least one surface point is based at least in part on the sensor arrangement output.

In various implementations, the method further includes operating the first light source (e.g., a multiwavelength laser light source) to provide at least a second wavelength laser beam at a second frequency. In such implementations, the acousto-optic modulator may be operated to receive the second wavelength laser beam and generate a corresponding second frequency shifted laser beam with a polarization that is rotated relative to a polarization of the second wavelength laser beam. The receiving optical element portion may receive the second wavelength laser beam and the second frequency shifted laser beam and may direct the beams along the optical path toward the birefringent optical element portion. The birefringent optical element portion may receive the second wavelength laser beam and the second frequency shifted laser beam and may combine the beams to output a corresponding second combined beam (e.g., for which the first and second combined beams may co-propagate and/or be part of a total combined beam that is provided by the heterodyne light source). The determining of the at least one measurement distance to the at least one surface point on the workpiece may be based on the measurement process which utilizes both the first combined beam and the second combined beam.

BRIEF DESCRIPTION OF THE DRAWINGS

FIG. 4 is a diagram of a look-up table utilized for phase unwrapping as part of the operations of a digital holography metrology system;

DETAILED DESCRIPTION

Figure 1:
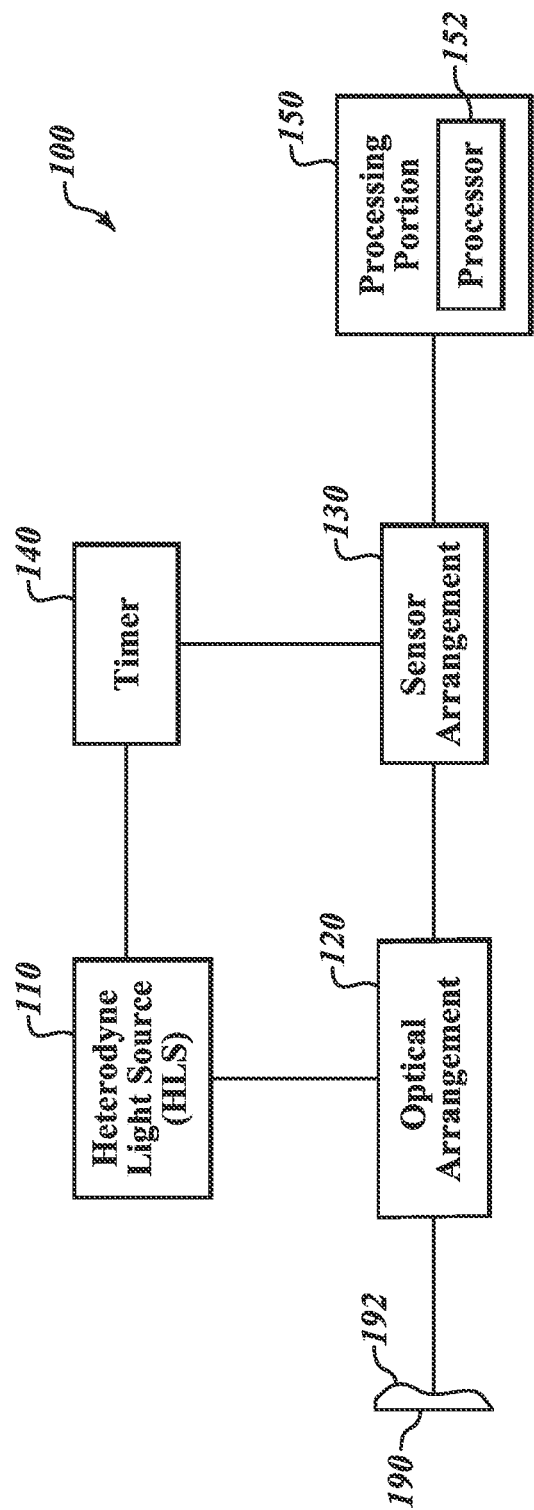
FIG. 1 is a block diagram showing various components of a metrology system including a heterodyne light source.

FIG. 1 is a block diagram showing various components of an implementation of a metrology system 100. As shown in FIG. 1, the metrology system 100 includes a heterodyne light source 110, an optical arrangement 120, a sensor arrangement 130, a timer 140 and a processing portion 150. In various implementations, the heterodyne light source 110 may include a light source, an acousto-optic modulator, and a source optical arrangement (e.g., as will be described in more detail below with respect to the examples of FIGS. 7-11). Briefly, the acousto-optic modulator may be configured to receive one or more input wavelength laser beams from the light source and generate one or more corresponding frequency shifted laser beams (e.g., which may be orthogonally polarized). The source optical arrangement may receive and combine the orthogonally polarized laser beams from the acousto-optic modulator and output corresponding combined laser beams.

The optical arrangement 120 (e.g., which may be a measurement optical arrangement) receives the combined output beams from the heterodyne light source 110. The optical arrangement 120 utilizes (e.g., directs) the combined beams as part of a measurement process (e.g., for which one or more beams may be directed toward a surface 192 of a workpiece 190 as part of a process to measure/determine at least one measurement distance to at least one surface point on the workpiece surface 192). As an example, in some implementations (e.g., as will be described in more detail below with respect to FIG. 2), the measurement optical arrangement 120 may be an interferometric optical arrangement which receives the combined beams from the heterodyne light source 110 and utilizes the combined beams for providing an output for imaging the workpiece surface 192 (e.g., to an image plane) as part of a measurement process.

The sensor arrangement 130 receives the outputs from the measurement optical arrangement 120 and includes one or more sensors for sensing the outputs and providing corresponding output signals. The timer 140 provides timing signals (e.g., clock signals) that are utilized for controlling timing, etc., of both the acousto-optic modulator of the heterodyne light source 110 and the sensors of the sensor arrangement 130. The processing portion 150 (e.g., including one or more processors 152) receives the outputs from the sensor arrangement 130 and utilizes the outputs (e.g., to determine measurement distances to surface points on the surface 192 of the workpiece 190).

Those skilled in the art will appreciate that the processing portion 150 (e.g., including or implemented in a computing system, etc.) and/or other processing or control systems described or usable with the elements and methods described herein, may generally be implemented using any suitable computing system or device, including distributed or networked computing environments, and the like. Such systems or devices may include one or more general purpose or special purpose processors (e.g., non-custom or custom devices) that execute software to perform the functions described herein. Software may be stored in memory, such as random access memory (RAM), read only memory (ROM), flash memory, or the like, or a combination of such components. Software may also be stored in one or more storage devices, such as optical based disks, flash memory devices, or any other type of non-volatile storage medium for storing data. Software may include one or more program modules that include processes, routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

Figure 2:
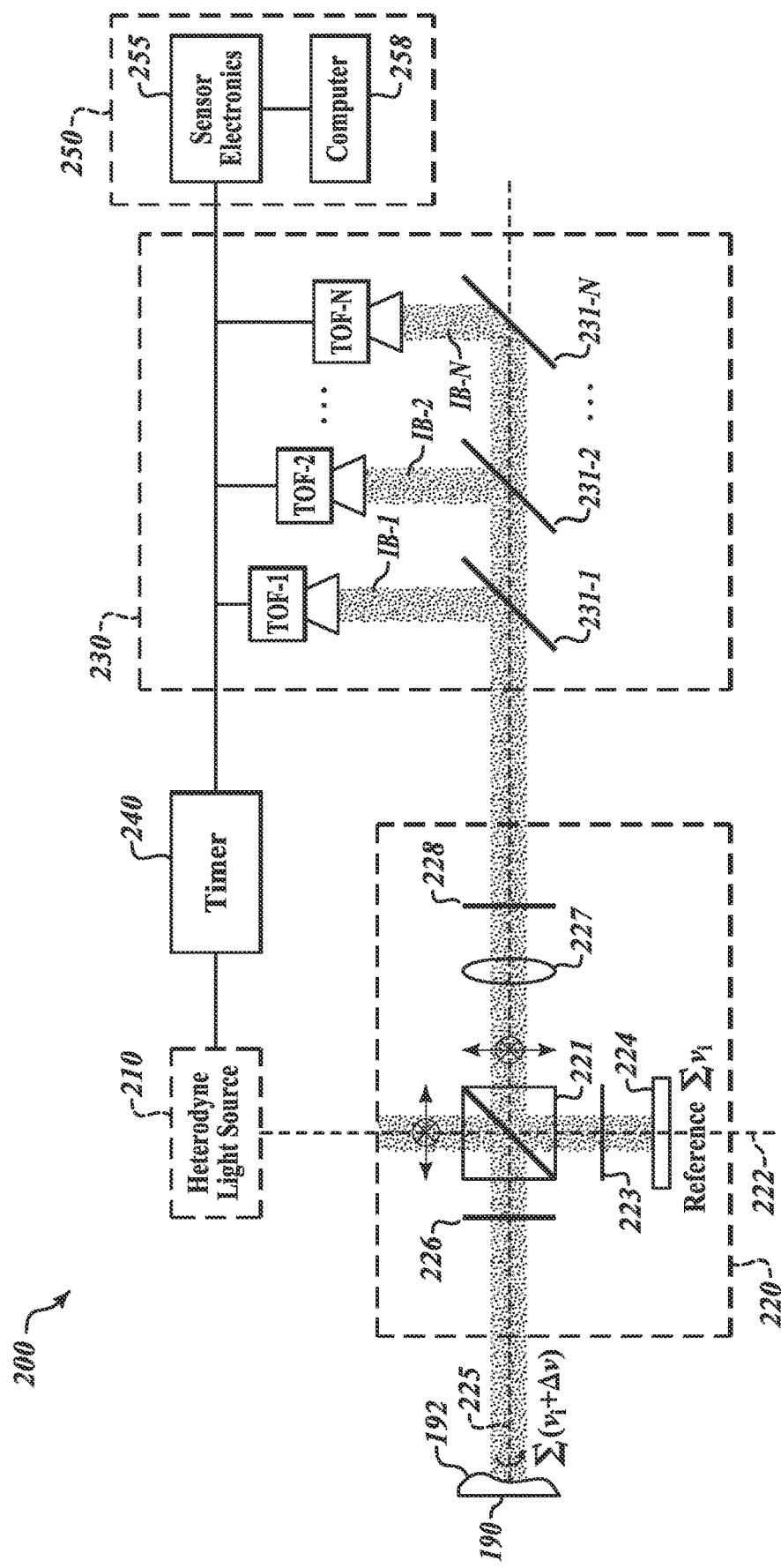
FIG. 2 is a block diagram of a digital holography metrology system including a heterodyne light source similar to that of FIG. 1.

FIG. 2 is a block diagram of a digital holography metrology system 200 including a heterodyne light source 210, which in various implementations may perform certain functions similar to the metrology system of FIG. 1. It will be appreciated that certain numbered components 2XX of FIG. 2 may correspond to and/or have similar operations as similarly numbered counterpart components 1XX of FIG. 1, and may be understood by analogy thereto, except as otherwise described below. This numbering scheme to indicate elements having analogous design and/or function (i.e., unless otherwise illustrated and/or described) is also applied to the remaining figures herein. As shown in FIG. 2, the digital holography metrology system 200 includes a heterodyne light source 210, an interferometric optical arrangement 220, a sensor arrangement 230, a timer 240 and a processing portion 250. In various implementations, the digital holography metrology system 200 may operate as a heterodyne imaging interferometer.

In various implementations, the heterodyne light source 210 includes a multiwavelength light source (e.g., a multiwavelength laser light source for providing laser beams of different wavelengths) which is coupled to an acousto-optic modulator (e.g., for which certain examples will be described in more detail below with respect to FIGS. 7-11). In one implementation, the multiwavelength laser light source may provide a first wavelength laser beam at a first frequency $v_1$, for which the acousto-optic modulator receives the first wavelength laser beam and generates a corresponding first frequency shifted laser beam at the frequency $v_1+\Delta v$, which is combined with the first wavelength laser beam as a first combined beam. Similarly, the multiwavelength laser light source may provide a second wavelength laser beam at a second frequency $v_2$ that is different than the first frequency (i.e., and with a corresponding second wavelength that is different than the first wavelength), for which the acousto-optic modulator receives the second wavelength laser beam and generates a corresponding second frequency shifted laser beam at the frequency $v_2+\Delta v$, which is combined with the second wavelength laser beam as a second combined beam. Similarly, the multiwavelength laser light source may provide a third wavelength laser beam at a third frequency $v_3$ that is different than the first and second frequencies (i.e., and with a corresponding third wavelength that is different than the first and second wavelengths), for which the acousto-optic modulator receives the third wavelength laser beam and generates a corresponding third frequency shifted laser beam at the frequency $v_3+\Delta v$, which is combined with the third wavelength laser beam as a third combined beam. In various implementations, the multiwavelength laser light source may provide additional wavelength laser beams with the acousto-optic modulator generating corresponding additional frequency shifted laser beams. In various implementations, different symbols may be interchangeably utilized herein for representing/corresponding to the frequencies of the laser beams (e.g., such as v, f, $\omega$, etc.).

The timer 240 is coupled to the heterodyne light source 210 (e.g., through a driver of the heterodyne light source to the acousto-optic modulator) to provide the reference clock signal on the basis of which the modulation frequency $\Delta v$ is generated. In various implementations, the clock signal is provided at the modulation frequency $\Delta v$ (e.g., in certain implementations in a range of 40 MHz-100 MHz). In various implementations, the distributed clock signal may be equivalent to the frequency of the acoustic wave in the acousto-optic modulator and equivalent to the frequency shift $\Delta v$ of the optical beam (e.g., photon frequency plus one acoustic phonon). In various alternative implementations, the distributed clock signal may be any other frequency which is multiplied/divided to the desired target frequency with additional electronic components.

The interferometric optical arrangement 220 (e.g., which may also be referenced as a measurement optical arrangement) includes a beam splitter 221, quarter wave plates 223 and 226, a reference mirror 224 (e.g., which may also be referred to herein as a reference surface 224), an imaging lens portion 227 (e.g., including an imaging lens such as a camera lens) and a polarizer 228. In various implementations, the interferometric optical arrangement 220 forms and/or operates as a double-path interferometer. The imaging lens portion 227 (e.g., which in some implementations may include a plurality of lenses and may be in a telecentric arrangement) is provided to image a surface 192 of the workpiece 190 (e.g., that is being measured and/or otherwise inspected, etc.) to an image plane. In various implementations, the image plane may be before, on, or after the sensors (e.g., sensor TOF-1, sensor TOF-2, etc.) of the sensor arrangement 230 (e.g., for which in various implementations the sensors may be spatially arranged so that the optical path length from the imaging lens portion 227 to each sensor may be approximately the same). As will be described in more detail below, in various implementations each sensor TOF may detect an optical beat signal at a difference frequency $\Delta v$ and demodulate on a per pixel basis. In various implementations, one depth-frame may consist of four phase measurements. The recorded holograms may be numerically propagated to the image plane where the height map (e.g., indicating measurements for surface points on the magnified workpiece surface 192 of the workpiece 190) is extracted (e.g., after phase unwrapping).

The beam splitter 221 is optically aligned with the reference mirror 224 along an axis 222. The beam splitter 221 is also optically aligned with the workpiece surface 192 along an axis 225 substantially perpendicular to the axis 222. The quarter waveplate 226 is provided between the beam splitter 221 and the workpiece surface 192, while the quarter waveplate 223 is provided between the beam splitter 221 and the reference mirror 224, and the imaging lens portion 227 and polarizer 228 are provided between the beam splitter 221 and the sensor arrangement 230 along the axis 225. The imaging lens portion 227 and polarizer 228 are optically aligned between the beam splitter 221 and the sensor arrangement 230.

The workpiece 190 to be inspected/measured is positioned with respect to the digital holography metrology system 200 such that the workpiece surface 192 is imaged by the imaging lens portion 227. In certain implementations, the workpiece surface 192 may be imaged onto the sensors (e.g., sensor TOF-1, sensor TOF-2, etc.) of the sensor arrangement 230, although it will be appreciated that such is not a requirement in a digital holography metrology system (e.g., in various implementations the workpiece surface 192, including respective surface points thereon, may be imaged to an image plane that is before or after the sensors TOF of the sensor arrangement 230).

In a digital holography metrology system such as that disclosed herein, wherever the sensors TOF are located relative to the image plane, the measurements of the laser beams by the sensors TOF may be numerically propagated to the image plane to determine the values that would occur at the image plane, and which may be utilized for the measurement processes as described herein. As an example of such numerical propagation, if an amplitude and phase of a laser beam is measured/determined at a measurement plane (e.g., at a sensor TOF), due to the knowledge of how the amplitude and phase of the laser beam vary over time and distance, the corresponding values can be numerically propagated (e.g., calculated) as would occur at the image plane (e.g., for which the relative location/distance of the image plane may be known according to the properties of the imaging lens, etc.). Such features may be particularly useful for measuring certain workpieces/workpiece features (e.g., for which height variations on the workpiece surface may be large enough that the entire workpiece surface may not fit within a single measurement range of certain systems, but for which a digital holography metrology system such as that disclosed herein may alternatively numerically propagate to the image plane to obtain/determine the needed values for the measurements, etc.).

In the example of FIG. 2, each frequency shifted laser beam is obtained by acousto-optic modulation of a corresponding wavelength laser beam (i.e., in the heterodyne light source 210). However, it will be appreciated that in other implementations each frequency shifted laser beam may be obtained using other techniques. For example, for each wavelength/frequency shifted laser beam pair, the laser may be a Zeeman laser having a lasing medium provided in a strong axial magnetic field to produce two laser beams having different wavelengths/frequencies. In accordance with terminology as utilized herein, even if a same beam path is shared, laser beams having different wavelengths/frequencies may in some instances each be referenced as an individual laser beam. If laser beams share a beam path and/or co-propagate, etc., the combination of such laser beams may in some instances be referenced as a combined beam.

In operation, the timer 240 provides the clock or reference signal to the sensor arrangement 230 and to a driver of the heterodyne light source 210. The acousto-optic modulator of the heterodyne light source 210 is driven by the driver at the modulation frequency $\Delta v$. As described above, a multiwavelength laser light source of the heterodyne light source 210 generates laser beams at different frequencies. For example, as noted above the multiwavelength laser light source may provide a first wavelength laser beam at a first frequency $v_1$. The acousto-optic modulator receives the input first wavelength laser beam and produces/generates a corresponding first frequency shifted laser beam at frequency $v_1+\Delta v$ that propagates along the first wavelength laser beam. As a result, with respect to the first wavelength laser beam, the output of the heterodyne light source 210 is a first combined beam. As will be described in more detail below, the first combined beam may be detected by the sensor arrangement 230 with an envelope modulated at the difference frequency $\Delta v$.

Similarly, the multiwavelength laser light source of the heterodyne light source 210 may provide a second wavelength laser beam at a second frequency $v_2$, for which the acousto-optic modulator receives the input second wavelength laser beam and produces/generates a corresponding second frequency shifted laser beam at the frequency $v_2+\Delta v$, and that propagates along the second wavelength laser beam, for which the corresponding output of the heterodyne light source 210 is a second combined beam. Similarly, the multiwavelength laser light source may provide a third wavelength laser beam at a third frequency $v_3$, for which the acousto-optic modulator receives the input third wavelength laser beam and produces/generates a corresponding third frequency shifted laser beam at the frequency $v_3+\Delta v$, and that propagates along the third wavelength laser beam, for which the corresponding output of the heterodyne light source 210 is a third combined beam. It will be appreciated that the total output of heterodyne light source 210 may thus include a total combined beam (e.g., which may include the first, second and third combined beams, etc.). In various implementations, the multiwavelength laser light source of the heterodyne light source 210 may provide additional wavelength laser beams with the acousto-optic modulator generating corresponding additional frequency shifted laser beams for forming corresponding additional combined beams, which may also be included in the total combined beam as output from the heterodyne light source 210.

In various implementations, a multiwavelength laser light source of the heterodyne light source 210 may in some instances include individual laser light sources for providing the laser beams with the different wavelengths. In various implementations, it may be desirable for such individual laser light sources (e.g., laser diodes) to have low temperature sensitivity. In various implementations utilizing individual laser light sources (i.e., laser light sources with respective wavelengths), the wavelength of each laser light source may drift in a same direction due to temperature changes, etc., for which a ratio between the wavelengths may remain relatively stable, which may thus result in relatively stable measurement accuracy for the system. In various implementations, a temperature sensitivity of each individual light source may be configured to match the corresponding wavelength, for which any drift of wavelength ratios due to temperature may be reduced or eliminated. When configuring a heterodyne light source 210 such as that disclosed herein, in various implementations individual laser light sources (e.g., which may have different values due to manufacturing tolerances, etc.) may be tested and a combination of laser light sources may be selected/utilized that provides desired ratios between the wavelengths.

Thus, in various implementations, different laser light sources may be included that provide a desired combination of wavelength ratios (e.g., in one specific example implementation providing wavelengths such as 633 nm, 687 nm and 767 nm). In one implementation, a first laser light source included in the multiwavelength laser light source may provide a first wavelength laser beam (e.g., in one specific example implementation with a nominal wavelength at 633 nm). The heterodyne light source 210 may correspondingly produce a first combined beam as described above as including a first wavelength laser beam having a first wavelength $\Delta_{S1}$ (e.g., 633 nm) with a vertical polarization and a first frequency shifted laser beam having a wavelength $\lambda_{FS1}$ with a horizontal polarization (e.g., each with a linear polarization). The timer 240 produces a clock signal (e.g., at 40 MHz) that sets the driving frequency of the acousto-optic modulator of the heterodyne light source 210. As a result, the first combined beam results in a detected beat signal (e.g., of 40 MHz).

Similarly, a second laser light source included in the multiwavelength laser light source of the heterodyne light source 210 may provide a second wavelength laser beam (e.g., in one specific example implementation with a nominal wavelength at 687 nm). The heterodyne light source 210 may correspondingly produce a second combined beam as described above as including a second wavelength laser beam having a second wavelength $\lambda_{S2}$ (e.g., 687 nm) with a vertical polarization and a second frequency shifted laser beam having a wavelength $\Delta_{FS2}$ with a horizontal polarization. Similarly, a third laser light source included in the multiwavelength laser light source may provide a third wavelength laser beam (e.g., in one specific example implementation with a nominal wavelength at 767 nm). The heterodyne light source 210 may correspondingly produce a third combined beam as described above as including a third wavelength laser beam having a third wavelength $\lambda_{S3}$ (e.g., 767 nm) with a vertical polarization and a third frequency shifted laser beam having a wavelength $\lambda_{FS3}$ with a horizontal polarization. As noted above, the timer 240 may produce a clock signal (e.g., at 40 MHz) that sets the driving frequency of the acousto-optic modulator of the heterodyne light source 210. As a result, each of the second and third combined beams generates a detected beat signal at the modulation frequency (e.g., of 40 MHz).

As noted above, during operation of the digital holography metrology system 200, the heterodyne light source 210 outputs the total combined beam including the combined beams to the interferometric optical arrangement 220. As will be described in more detail below, the interferometric optical arrangement 220 utilizes the combined beams for providing an output for imaging the surface 192 of the workpiece 190 (e.g., to an image plane). For example, as will be described in more detail below, in one example implementation where three wavelengths are utilized, the output of the interferometric optical arrangement 220 may include first, second and third interference beams. In various implementations, the first interference beam is produced based on the first combined beam from the heterodyne light source, the second interference beam is produced based on the second combined beam from the heterodyne light source, and the third interference beam is produced based on the third combined beam from the heterodyne light source.

In further regard to the examples above, upon incidence of the first combined beam onto the beam splitter 221 (e.g., a polarizing beam splitter) of the interferometric optical arrangement 220, the first reference beam having the frequency $v_1$ and vertical polarization propagates along the axis 222 towards the reference mirror 224, while the first signal beam having the frequency $v_1+\Delta v$ and horizontal polarization propagates along the axis 225 to illuminate a portion of the workpiece surface 192. The first reflected reference beam (i.e., from the reference mirror 224) and the first reflected signal beam (i.e., from the workpiece surface 192) are then combined by the beam splitter 221 thus forming a first reflected combined beam that propagates along the axis 222 towards the sensor arrangement 230 via the imaging lens portion 227. The quarter waveplate 226 is used to transform the polarization of the first incident beam at frequency $v_1+\Delta v$ from horizontal to circular and to transform the polarization of the first reflected signal beam from circular to vertical. Similarly, the quarter waveplate 223 is used to transform the polarization of the first incident beam at frequency $v_1$ from vertical to circular and to transform the polarization of the first reflected reference beam from circular to horizontal. As a result, the polarization of the first reflected signal beam and the first reflected reference beam after the first and second quarter waveplates respectively are orthogonal, thus preventing interference.

The workpiece surface 192 is imaged to an image plane via the imaging lens portion 227, as will be described in more detail below. The polarizer 228 is used to control the polarization of the first two reflected beams allowing them to form a first interference beam. A first dichroic component 231-1 (e.g., a dichroic filter utilized to separate individual wavelengths) operates to reflect the first interference beam IB-1 toward a sensor TOF-1 (e.g., a time of flight sensor, which in various implementations may be a time of flight camera, etc.) of the sensor arrangement 230. As will be described in more detail below, the first dichroic component 231-1 also operates to transmit/pass other interference beams with different wavelengths to continue along the axis 225 to be reflected by other dichroic components toward other sensors of the sensor arrangement 230. In various implementations, the dichroic components as defined herein may each comprise any optical component or components which can split a beam of light into two beams with differing wavelengths. As noted above, the workpiece surface 192 is imaged to an image plane via the imaging lens portion 227 (e.g., for which the image plane may be before, on, or after the sensor TOF-1).

Upon incidence of the second combined beam onto the beam splitter 221, the second reference beam having the frequency $v_2$ and vertical polarization propagates along the axis 222 towards the reference mirror 224 while the second signal beam having the frequency $v_2+\Delta v$ and horizontal polarization propagates along the axis 225 to illuminate a portion of the workpiece surface 192. The second reflected reference beam and the second reflected signal beam are then combined by the beam splitter 221 thus forming a second reflected combined beam that propagates along the axis 225 towards the sensor arrangement 230 via the imaging lens portion 227. The quarter waveplate 226 is used to transform the polarization of the second incident beam at frequency $v_2+\Delta v$ from horizontal to circular and to transform the polarization of the second reflected signal beam from circular to vertical. Similarly, the quarter waveplate 223 is used to transform the polarization of the second incident beam at frequency $v_2$ from vertical to circular and to transform the polarization of the second reflected reference beam from circular to horizontal. As a result, the polarization of the second reflected signal beam and the second reflected reference beam after the first and second quarter waveplates respectively are orthogonal, thus preventing interference.

The workpiece surface 192 is imaged to an image plane via the imaging lens portion 227, as will be described in more detail below. The polarizer 228 is used to control the polarization of the second two reflected beams allowing them to form a second interference beam. A second dichroic component 231-2 operates to reflect the second interference beam IB-2 toward a sensor TOF-2 of the sensor arrangement 230. The second dichroic component 231-2 also operates to transmit/pass other interference beams with different wavelengths to continue along the axis 225 to be reflected by other dichroic component(s) toward other sensor(s) of the sensor arrangement 230, similar to how the first dichroic component 231-1 reflects the first interference beam IB-1 while transmitting/passing the second interference beam IB-2. As noted above, the workpiece surface 192 is imaged to an image plane via the imaging lens portion 227 (e.g., for which the image plane may be before, on, or after the sensor TOF-2).

It will be appreciated that similar processes may occur for additional combined beams of the system. For example, similar to the processes described above, there may be a final combined beam (e.g., numbered as an Nth combined beam), for which there may be a corresponding final reference beam having a frequency $v_N$ and vertical polarization and a final signal beam having the frequency $v_N+\Delta v$ and horizontal polarization. A corresponding final reflected reference beam and a final reflected signal beam may form a final reflected combined beam, from which a final interference beam may be formed. The workpiece surface 192 may be imaged to an image plane via the imaging lens portion 227, as will be described in more detail below. A final dichroic component 231-N operates to reflect the final interference beam IB-N toward the sensor TOF-N. As noted above, the workpiece surface 192 is imaged to an image plane via the imaging lens portion 227 (e.g., for which the image plane may be before, on, or after the sensor TOF-N).

It will be appreciated that in an implementation where N=3, the final combined beam may be a third combined beam, or in an implementation where N is greater than 3 there may also be a third combined beam of the system. In either case, there may be a corresponding third reference beam having a frequency $v_3$ and vertical polarization and a third signal beam having the frequency $v_3+\Delta v$ and horizontal polarization. A corresponding third reflected reference beam and a third reflected signal beam may form a third reflected combined beam, from which a third interference beam may be formed. A third dichroic component 231-3 may operate to reflect the third interference beam IB-3 toward the sensor TOF-3 (i.e., sensor TOF-N when N=3). It will be appreciated that the utilization of the dichroic components enables the use of multiple wavelength laser beams in the heterodyne light source 210 for which the beams are combined in a common beam path and then divided by the dichroic components to be received by the sensors TOF (e.g., as part of the associated measurement functions, etc.).

More specifically, as noted above, the first dichroic component 231-1 is configured to separate the first interference beam IB-1 from the second and third interference beams IB-2 and IB-3, for which the first interference beam IB-1 is directed (e.g., by the first dichroic component 231-1) to be received by the first sensor TOF-1 (e.g., a time of flight sensor). The second dichroic component 231-2 is configured to separate the second interference beam IB-2 from the third interference beam IB-3, for which the second interference beam IB-2 is directed (e.g., by the second dichroic component 231-2) to be received by the second sensor TOF-2 (e.g., a time of flight sensor). The third interference beam IB-3 is directed (e.g., by the third dichroic component 231-3) to be received by the third sensor TOF-3 (e.g., a time of flight sensor).

As noted above, the total output of heterodyne light source 210 may be a total combined beam (e.g., which may include the first, second and third combined beams, such as in the above example where N=3). In accordance with the operations as described above, upon incidence of the total combined beam from the heterodyne light source 210 onto the beam splitter 221, the combined reference beam including the first, second and third reference beams having the respective frequencies $v_1$, $v_2$ and $v_3$ and vertical polarization, propagates along the axis 222 towards the reference mirror 224 (e.g., for which the beam combination at the reference mirror 224 may be represented as $\Sigma v_i$, which in this example indicates the combined reference beam includes the reference beams having the frequencies $v_1$, $v_2$ and $v_3$). Also in accordance with the operations as described above, further upon incidence of the total combined beam from the heterodyne light source 210 onto the beam splitter 221, the combined signal beam including the first, second and third signal beams having the respective frequencies $v_1+\Delta v$, $v_2+\Delta v$ and $v_3+\Delta v$ and horizontal polarization propagates along the axis 225 to illuminate a portion of the workpiece surface 192 (e.g., for which the beam combination at the workpiece surface 192 may be represented as $\Sigma v_i+\Delta v$, which in this example indicates the combined signal beam includes the signal beams having the frequencies $v_1+\Delta v$, $v_2+\Delta v$ and $v_3+\Delta v$).

In various implementations, the axis 225 may correspond to/be defined as a measurement axis of the digital holography metrology system 200, for which a measurement distance may correspond to a distance from the digital holography metrology system 200 (e.g., from a specified component or reference point of the digital holography metrology system 200, such as near or at the quarter wave plate 226, or near or at an end of a casing that encases the interferometric optical arrangement 220, etc.) to a surface point on the workpiece surface 192. In various implementations, the axis 225 may also or alternatively correspond to/be defined as a z-axis of the digital holography metrology system 200, for which measurement distances may be referenced as z-distances or in accordance with z-heights. In various implementations, different z-heights of surface points on the workpiece surface 192 (e.g., as part of an overall surface profile or otherwise), may be in relation to a reference point and/or relative to one another in accordance with their relative z-heights, such as relative to a reference point on the workpiece surface which may be designated as having a z-height of z=0. In various implementations, a z-height of each surface point may correspond to/be determined in accordance with a respective measurement distance/z-distance from the digital holography metrology system 200 to the surface point.

In configurations such as those disclosed herein where dichroic components are utilized, in various implementations it may be desirable for the wavelengths of the beams to be sufficiently separated so that the beams can be effectively separated by the dichroics. In contrast, certain prior systems have utilized beams with wavelengths that are very close (e.g., with less than 1 nm separation, such as to achieve combined synthetic wavelengths to achieve long absolute measurement ranges, etc.). In configurations as disclosed herein, it may alternatively be advantageous to utilize combinations of wavelengths with relatively larger separations (e.g., such as a separation of at least 2%, or 5%, of the value of the shortest wavelength, or a separation of at least 10 nm or 20 nm), so that the dichroics, which separate based on wavelengths, may effectively separate the beams. One specific example combination of wavelengths that meets such requirements is $\lambda_1$=633 nm, $\lambda_2$=687 nm and $\lambda_3$=767 nm (e.g., for which 2% of the shortest wavelength is less than 13 nm, and 5% is less than 32 nm, which are each less than the separations between the shortest and longest wavelengths, or between any of the wavelengths in this example, as are separations of 10 nm or 20 nm).

For each sensor TOF (e.g., TOF-1, TOF-2 . . . TOF-N) of the sensor arrangement 230, the sensor TOF may, in various implementations, be a time of flight sensor which is configured to determine the phase relationship between the modulation signal and the interference beam received at each pixel. The sensor TOF outputs a signal which compares the phase of the modulated intensity of the light signal falling on each pixel with an electrical reference signal at the modulating frequency, derived from the signal from the timer 240 (e.g., which may function as a common clock source). In various implementations, the sensor TOF may output quadrature signals (IQ) from which the phase is calculated. In various implementations, such calculations may be performed on the sensor itself (e.g., on a chip/processor on the sensor TOF) or on an associated processor/chip (e.g., provided in sensor electronics 255 or host computer 258, etc., of the processing portion 250). In general, the processing portion 250 receives the outputs from the sensors TOF (e.g., TOF-1, TOF-2 . . . TOF-N) of the sensor arrangement 230 and utilizes the outputs (e.g., to determine measurement distances to surface points on the surface 192 of the workpiece 190).

In various implementations, the timer 240 may be part of, or receive a timing signal from, at least one of the sensors TOF (e.g., sensor TOF-1). In such implementations, the phase and frequency of the acousto-optic modulator of the heterodyne light source 210 may be effectively controlled by the sensor TOF (i.e., by the timer of the sensor TOF). In various implementations, each sensor TOF may perform 4 phase measurements with 90 degree offset within one depth-frame to measure amplitude and phase. Each pixel on each sensor TOF may be a photonic mixer device combining detection and demodulation. In various implementations, the sensor TOF may only be sensitive to the difference frequency from the measurement signal and reference arm (i.e., including the reference mirror 224). Sum-frequency terms may average out and be removed together with direct current (DC) terms through correlated double sampling.

In various implementations, the digital holography metrology system 200 operates as a phase-shifting holography system that measures the phase difference between the workpiece wave and reference wave (e.g., from the respective reflected signal beam and the reflected reference beam) on a per pixel basis. Certain prior systems have required a computational step to calculate a hologram from at least 3 interferograms whereas in accordance with principles disclosed herein, the calculation may be performed (e.g., on the sensor TOF or in a processing portion, etc.) at least approximately in real-time. In various implementations, the measured holograms are numerically propagated to the image plane where the phase information from all wavelengths is combined using a phase unwrapping routine to reconstruct the surface profile over a relatively long non-ambiguity range (e.g., an absolute measurement range).

In regard to the sensors TOF, it will be appreciated that time of flight sensors such as time of flight cameras in various implementations may have very good phase resolution which can be utilized to achieve a large non-ambiguity range (NAR) for the measurements of the system (e.g., for determining absolute measurement distances to surface points on workpieces, etc.). In general, the better the resolution of the sensors TOF, the longer the non-ambiguity range that can be achieved (e.g., as a path that can be decoded, etc.). As defined herein, a time of flight sensor is any sensor or configuration that is configured to sense values that indicate the amplitude and phase of a laser beam. The ratios of the wavelengths that are utilized are another important factor in regard to the achievable non-ambiguity ranges. Thus, in various implementations, for a given system it is desirable to determine/utilize wavelength ratios which result in signals that can be unwrapped/decoded in such a manner that a large non-ambiguity range can be achieved.

Figure 3A:
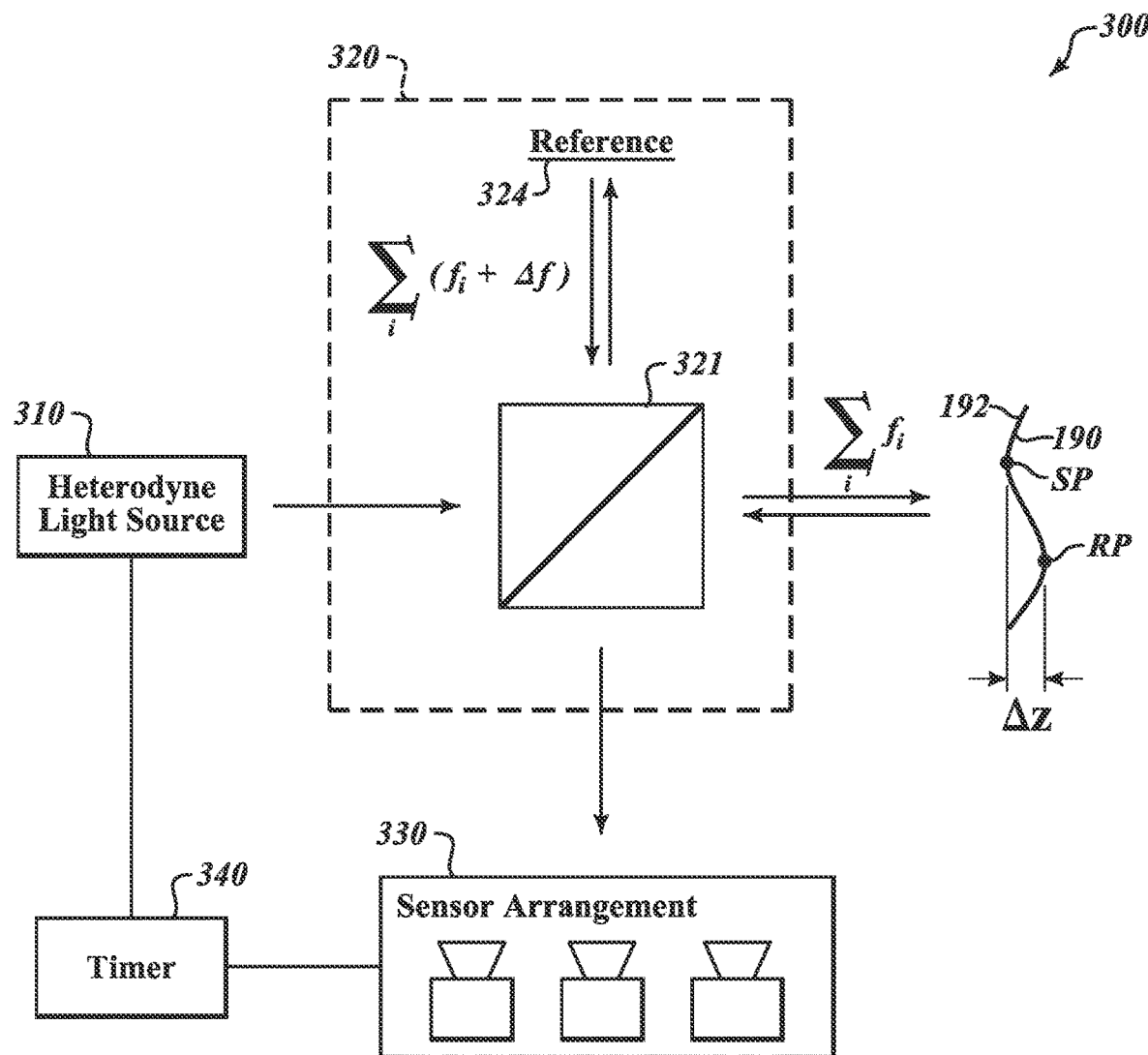
FIGS. 3A-3C are diagrams illustrating certain operating principles of a digital holography metrology system such as that of FIG. 2.
Figure 3B:
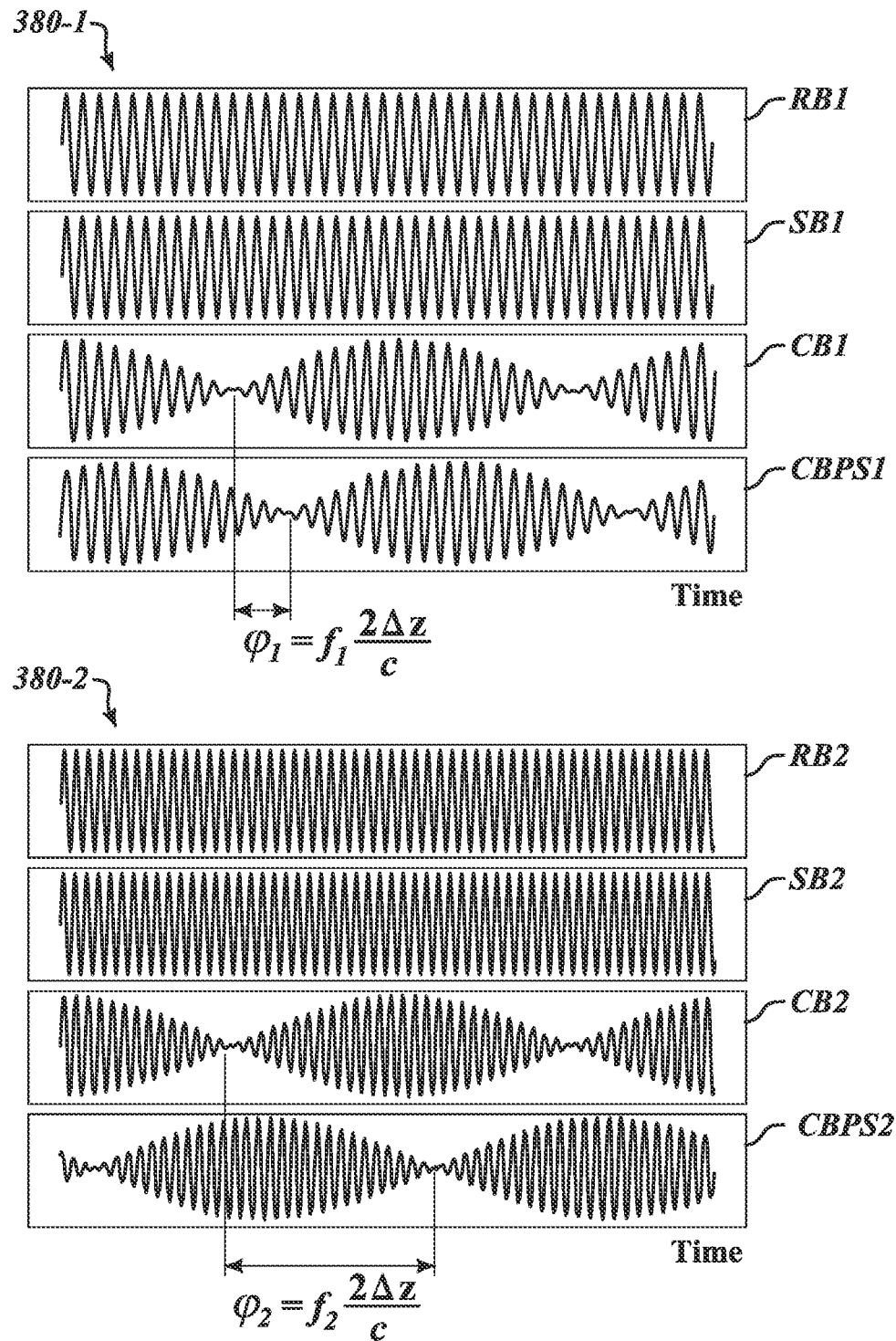
Figure 3C:
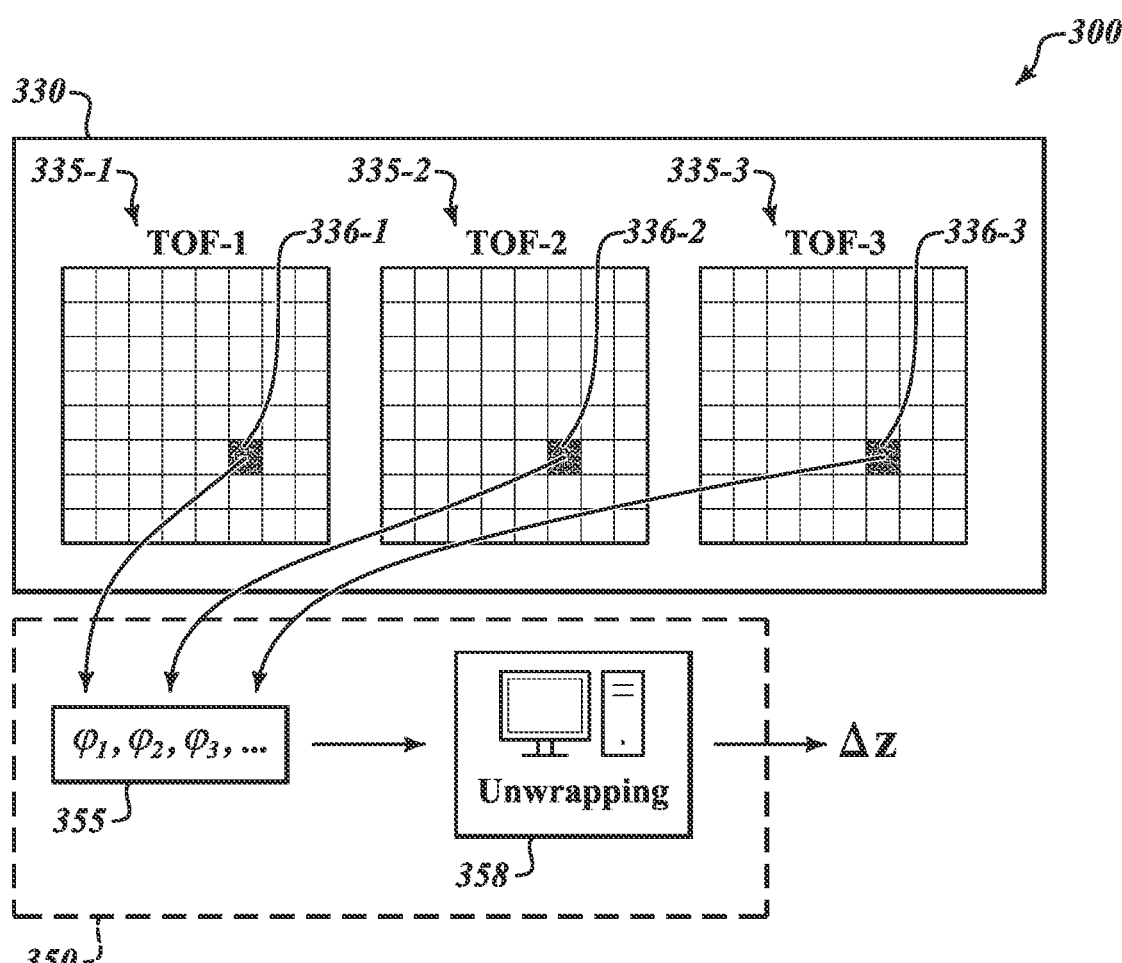

FIGS. 3A-3C are diagrams illustrating certain operating principles of a digital holography metrology system 300, similar to the digital holography metrology system 200 of FIG. 2. Only certain portions of the digital holography metrology system 300 are illustrated in FIGS. 3A-3C, for simplicity in relation to describing the relevant operating principles. It will be appreciated that certain numbered components 3XX of FIGS. 3A-3C may correspond to and/or have similar operations as similarly numbered counterpart components 1XX of FIG. 1 or 2XX of FIG. 2, and may be understood by analogy thereto, except as otherwise described below. As illustrated in FIG. 3A, the output of a heterodyne light source 310 is received by an interferometric optical arrangement 320. Correspondingly, the output of the interferometric optical arrangement 320 is received by a sensor arrangement 330.

Similar to the operations described above with respect to FIG. 2, the heterodyne light source 330 may provide an output that consists of a collimated beam with multiple fundamental frequencies in one polarization and all frequency shifted components in the orthogonal polarization state (e.g., as provided as a total combined collimated beam including a first combined beam, a second combined beam, a third combined beam, etc.). Upon incidence of the first combined beam onto a beam splitter 321 (e.g., a polarizing beam splitter) of the interferometric optical arrangement 320, the first signal beam having frequency $f_1$ propagates to illuminate a portion of the workpiece surface 192 while the first reference beam having an orthogonal polarization and the frequency $f_1+\Delta f$ propagates towards a reference surface 324 (e.g., a reference mirror). It will be appreciated that the beams utilized for the signal beam and the reference beam in this example are switched relative to the beams utilized in the example described above with respect to FIG. 2, for which either configuration may be utilized in various implementations. The first reflected signal beam and the first reflected reference beam are then combined by the beam splitter 321 thus forming a first reflected combined beam that propagates towards the sensor arrangement 330.

Upon incidence of the second combined beam onto the beam splitter 321, the second signal beam having frequency $f_2$ propagates to illuminate a portion of the workpiece surface 192 while the second reference beam having an orthogonal polarization and the frequency $f_2+\Delta f$ propagates towards the reference surface 324. The second reflected signal beam and the second reflected reference beam are then combined by the beam splitter 321 thus forming a second reflected combined beam that propagates towards the sensor arrangement 330. A similar process occurs upon incidence of the third combined beam onto the beam splitter 321, etc. In various implementations, this type of process may be performed for measuring a reference point RP on the workpiece surface 192 (e.g., which may be designated as a z=0 or other z-height) and subsequently for measuring other surface points SP on the workpiece surface, as will be described in more detail below with respect to FIG. 3B.

Similar to the processes described above, the total output of heterodyne light source 310 may be a total combined beam (e.g., which may include the first, second and third combined beams in an example where N=3). In accordance with the operations as described above, upon incidence of the total combined beam from the heterodyne light source 310 onto the beam splitter 321, the combined signal beam including the first, second and third signal beams having the respective frequencies $f_1$, $f_2$ and $f_3$ and vertical polarization, propagates along an axis to illuminate a portion of the workpiece surface 192 (e.g., for which the beam combination at the workpiece surface 192 may be represented as $\Sigma f_i$, which in this example indicates that the combined signal beam includes the signal beams having the frequencies $f_1$, $f_2$ and $f_3$). Also in accordance with the operations as described above, further upon incidence of the total combined beam from the heterodyne light source 310 onto the beam splitter 321, the combined reference beam including the first, second and third reference beams having the respective frequencies $f_1+\Delta f$, $f_2+\Delta f$ and $f_3+\Delta f$ and horizontal polarization propagates along an axis toward the reference surface 324 (e.g., for which the beam combination at the reference surface 324 may be represented as $\Sigma f_i+\Delta f$, which in this example indicates the combined reference beam includes the reference beams having the frequencies $f_1+\Delta f$, $f_2+\Delta f$ and $f_3+\Delta f$).

FIG. 3B illustrates various example signals in relation to the processes described above, including a first set of example signals 380-1 and a second set of example signals 380-2. The first set of example signals 380-1 includes a first reference beam signal RB1 (e.g., having a frequency $f_1+\Delta f$), a first signal beam signal SB1 (e.g., having a frequency $f_1$), a first combined beam signal CB1 (e.g., modulated at a beat frequency $\Delta f$) and a first combined beam phase shifted signal CBPS1 (e.g., modulated at a beat frequency $\Delta f$ with an additional phase shift resulting from a path length difference $2\Delta z$). In various implementations, the first combined beam signal CB1 may result from measuring a reference point on the workpiece surface (e.g., reference point RP in FIG. 3A). The first combined beam phase shifted signal CBPS1 may result from subsequently measuring a different surface point on the workpiece surface (e.g., surface point SP in FIG. 3A). As indicated in FIG. 3B, a difference between the signals CB1 and BCPS1 corresponds to a first phase shift $\varphi_1=(f_1)(2\Delta z)/c$, where c corresponds to the speed of light.

The second set of example signals 380-2 includes a second reference beam signal RB2 (e.g., having a frequency $f_2+\Delta f$), a second signal beam signal SB2 (e.g., having a frequency $f_2$), a second combined beam signal CB2 (e.g., modulated at a beat frequency $\Delta f$) and a second combined beam phase shifted signal CBPS2 (e.g., modulated at a beat frequency $\Delta f$ with an additional phase shift resulting from the path length difference $2\Delta z$). In various implementations, the second combined beam signal CB2 may result from measuring the reference point on the workpiece surface (e.g., reference point RP in FIG. 3A). The second combined beam phase shifted signal CBPS2 may result from subsequently measuring a surface point on the workpiece surface (e.g., surface point SP in FIG. 3A). As indicated in FIG. 3B, a difference between the signals CB2 and BCPS2 corresponds to a second phase shift $\varphi_2=(f_2)(2\Delta z)/c$, where c corresponds to the speed of light. It will be appreciated that a similar process may be performed utilizing a third combined beam for determining a third phase shift $\varphi_3$, etc.

FIG. 3C illustrates certain components of the digital holography metrology system 300 in relation to the processing of the phase shifts indicated in FIG. 3B. As shown in FIG. 3C, the sensor arrangement 330 includes sensors TOF-1, TOF-2 and TOF-3, which each include a respective pixel array 335-1, 335-2 and 335-3. In each of the pixel arrays, a respective pixel 336-1, 336-2 and 336-3 is indicated as being utilized for measuring a particular surface point on the workpiece surface 192 (e.g., the surface point SP as illustrated in FIG. 3A). In various implementations, a processing portion 350 may receive (e.g., at sensor electronics 355) data (e.g., such as that described above) regarding the phase shifts $\varphi_1$, $\varphi_2$, $\varphi_3$, etc. The processing portion 350 (e.g., utilizing computer 358) may then perform phase unwrapping (e.g., to determine a value for $\Delta z$ based on the phase shifts $\varphi_1$, $\varphi_2$, $\varphi_3$, etc.). In various implementations, determining a value for $\Delta z$ corresponds to determining a measurement distance to the surface point (e.g., surface point SP) on the surface 192 of the workpiece 190. A simplified example for performing phase unwrapping (e.g., for determining $\Delta z$) utilizing a look-up table is described in more detail below with respect to FIGS. 4 and 5.

FIG. 4 is a diagram of a look-up table 400 utilized for phase unwrapping as part of the operations of a digital holography metrology system. In the example of FIG. 4, a first column corresponds to a first sensor TOF-1, which receives signals corresponding to a first wavelength laser beam having a first wavelength $\lambda_1$ (e.g., where $\lambda_1$=500 nm), for which the first column includes values corresponding to different possible phases $\varphi_1$ (e.g., for which the phases $\varphi_1$, $\varphi_2$, $\varphi_3$ of FIG. 4 may correspond to phase shifts as described above with respect to FIGS. 3A-3C). In FIG. 4, a second column corresponds to a second sensor TOF-2, which receives signals corresponding to a second wavelength laser beam having a second wavelength $\lambda_2$ (e.g., where $\lambda_2$=800 nm), for which the second column includes values corresponding to different possible phases $\varphi_2$. A third column corresponds to a third sensor TOF-3, which receives signals corresponding to a third wavelength laser beam having a third wavelength $\lambda_3$ (e.g., where $\lambda_3$=1000 nm), for which the third column includes values corresponding to different possible phases $\varphi_3$. As a specific example of using the look-up table 400, if the phases $\varphi_1$, $\varphi_2$, $\varphi_3$, have values corresponding to 216 degrees, 90 degrees, and 288 degrees, respectively, such values can be seen to correspond to a surface height $\Delta z$ for the measured surface point SP (e.g., relative to a height of a reference point RP on the workpiece surface as illustrated in FIG. 3A) of $\Delta z=0.9$ microns. The values in the fourth column of the table 400 are shown to extend over a range from surface height $\Delta z=0$ to $\Delta z=2.0$ microns (for a total non-ambiguity range of 2.0 microns), in 0.1 micron steps. Such relationships are further illustrated in FIG. 5, as will be described in more detail below.

Figure 5:
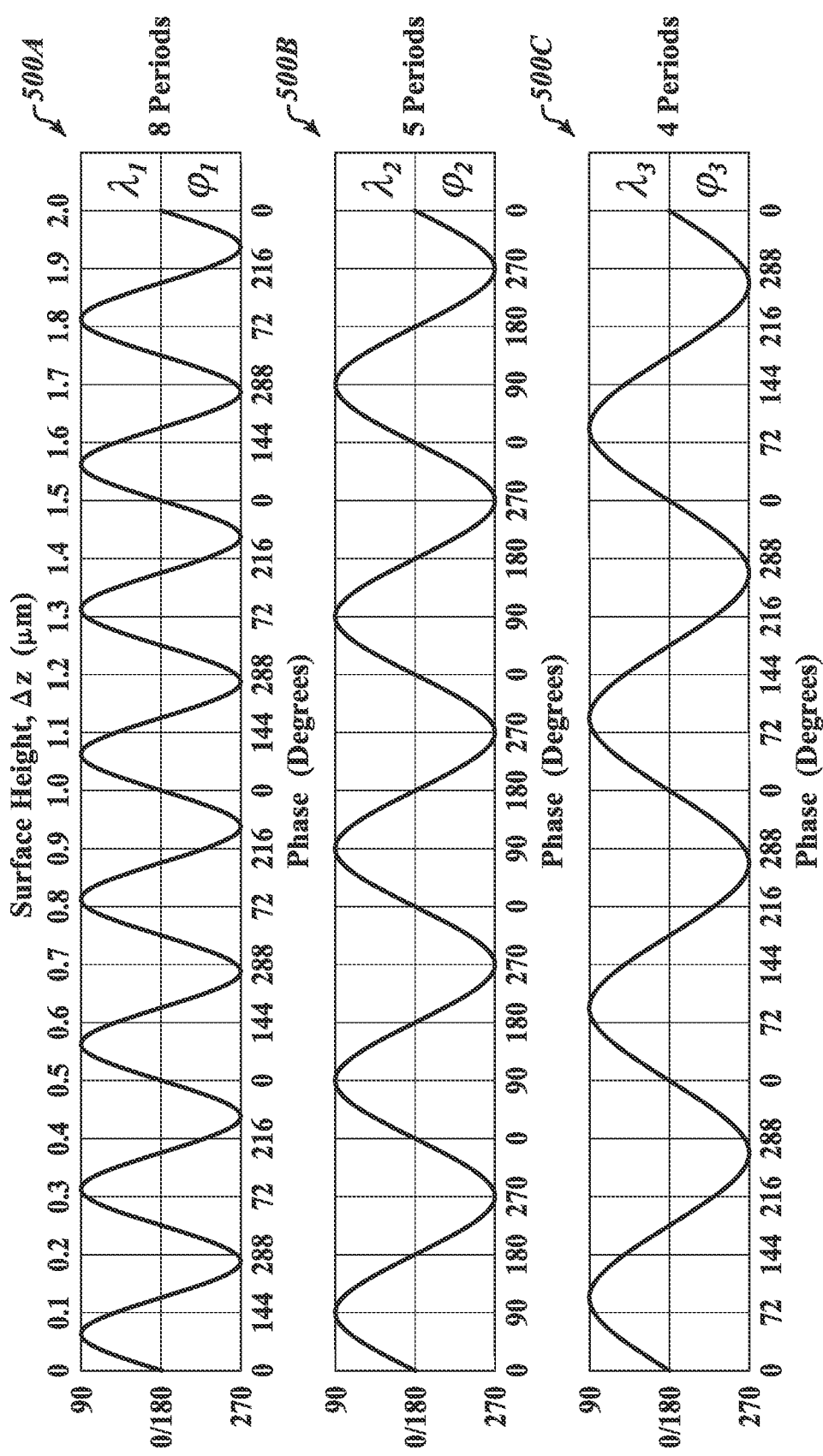
FIG. 5 is a diagram graphically illustrating certain values from the look-up table of FIG. 4.

FIG. 5 is a diagram graphically illustrating certain values from the look-up table of FIG. 4. FIG. 5 includes three graphs 500A, 500B and 500C, with a cycle of phase values indicated on the Y-axis of each graph, and for which values are plotted relative to a surface height scale that is included along an X-axis at the top of graph 500A (and for which phase values as corresponding to each indicated surface height of each 0.1 micron step are also indicated on a bottom X-axis of each graph). As shown in FIG. 5, the graph 500A illustrates the values for the first phase $\varphi_1$ as corresponding to the laser beam with the first wavelength $\lambda_1$ (i.e., where $\lambda_1=500$ nm), and for which the values are shown to cycle through 8 periods. The graph 500B illustrates the values for the second phase $\varphi_2$ as corresponding to the laser beam with the second wavelength $\lambda_2$ (i.e., where $\lambda_2=800$ nm), and for which the values are shown to cycle through 5 periods. The graph 500C illustrates the values for the third phase $\varphi_3$ as corresponding to the laser beam with the third wavelength $\lambda_3$ (i.e., where $\lambda_3=1000$ nm), and for which the values are shown to cycle through 4 periods.

As illustrated by FIG. 5, the surface height $\Delta z$ values depend not only on each phase value, but also which period each phase value falls within. As an example, for the surface height $\Delta z=0.9$ microns as noted above, the phase $\varphi_1=216$ degrees and falls within the 4th period of the corresponding waveform, the phase $\varphi_2=90$ degrees and falls within the third period of the corresponding waveform, and the phase $\varphi_3=288$ degrees and falls within the second period of the corresponding waveform. The phase unwrapping process thus determines a unique surface height $\Delta z$ as corresponding to the unique combination of phase values (i.e., and which in accordance with the graphical illustration of FIG. 5 indicates the periods that each of the phase values fall within).

In the example of FIGS. 4 and 5, the wavelengths $\lambda_1=500$ nm, $\lambda_2=800$ nm and $\lambda_3=1000$ nm are chosen for simplicity for illustrating the operating principles as described above, and in this example result in a non-ambiguity range of 2.0 microns. In accordance with principles disclosed herein, other wavelength combinations may be selected and utilized (e.g., which may result in longer non-ambiguity ranges). For example, a combination of wavelengths $\lambda_1=633$ nm, $\lambda_2=687$ nm and $\lambda_3=767$ nm, which may be achieved utilizing certain commercially available laser light sources, may result in certain implementations in a non-ambiguity range of approximately 8.82 mm. In various implementations, a corresponding $\Delta z$ step size may be chosen/utilized based on how precise the phase measurement may be (e.g., in terms of signal to noise ratio, etc.).

In various implementations, various types of phase unwrapping routines may be utilized (e.g., for determining the surface height $\Delta z$ value based on a unique combination of phase values). For example, as an alternative or in addition to a look-up table such as that described above with respect to FIGS. 4 and 5, a machine learning process may be utilized for the phase unwrapping. As an example of such phase unwrapping utilizing machine learning, a K-nearest neighbor (KNN) regressor may be trained on data for the machine learning. The effectiveness of such a process has been determined by training a KNN regressor on clean data without any noise and then using it to demonstrate phase unwrapping as performed in relation to relatively noisy data. Such tests have confirmed that these processes (e.g., including utilizing machine learning for the phase unwrapping, such as with a KNN model) result in a high degree of accuracy for the determination of the measurements.

It will be appreciated that a digital holography metrology system such as that disclosed herein (e.g., with heterodyne detection using time of flight cameras as sensors) may have various advantages over certain prior metrology systems. The utilized heterodyne detection enables high signal-to-noise ratios in holography which are taken advantage of to both increase the non-ambiguity range (NAR) as well the precision of the measurements that are performed. In addition, a phase unwrapping routine is used that does not rely on synthetic wavelengths to enable long non-ambiguity ranges (e.g., absolute measurement ranges). Wavelength-multiplexing is performed (e.g., as may be enabled by utilizing dichroics, which may be commercially available at relatively low cost, and which can be used to separate the signal beams with the individual wavelengths). Wavelength-multiplexing may be utilized to capture all phases for all wavelengths relatively simultaneously within one depth-frame using multiple TOF cameras for increased environmental robustness.

Such rapid acquisition of the measurement data helps ensure that there is minimal or no movement between the workpiece and system while the measurement data is being captured (e.g., as opposed to prior systems where images and/or data were captured individually or otherwise in sequence, thus taking more time and potentially allowing the workpiece to move relative to the system, such as due to vibration, accidental movement, normal progression of a workpiece along a conveyor, etc.). Computational workload is decreased compared to prior systems by measuring phases directly, for which a phase retrieval routine is not required. Configurations as disclosed herein may in some implementations utilize three different wavelengths to achieve similar performance as existing multiwavelength systems utilizing six different wavelengths, and thus may result in lower cost for similar performance. In various implementations, configurations such as those disclosed herein may be utilized for applications such as high-throughput inline metrology sampling/measuring, etc.

Figure 6A:
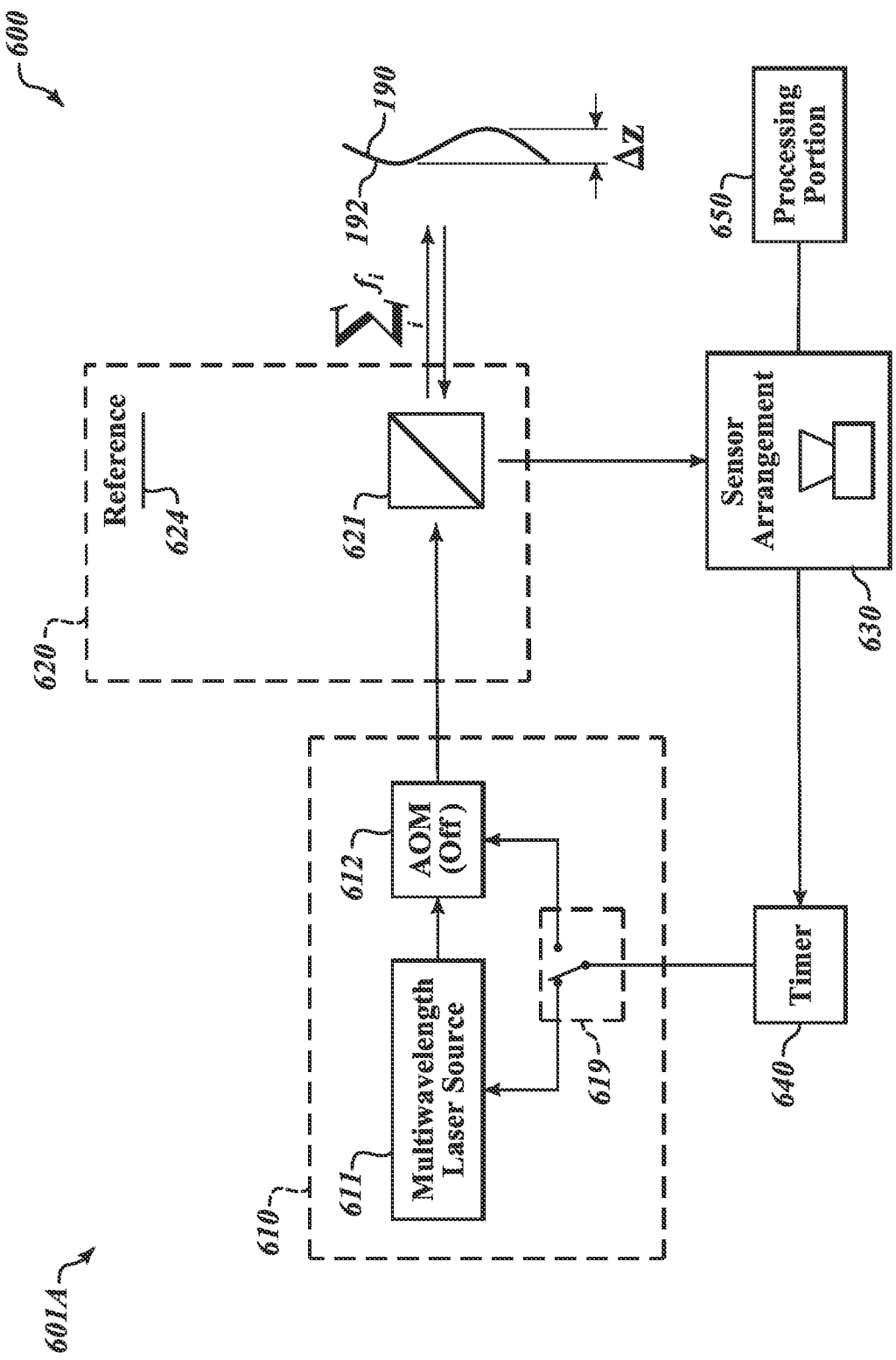
FIGS. 6A and 6B are diagrams illustrating different operating modes of a digital holography metrology system.
Figure 6B:
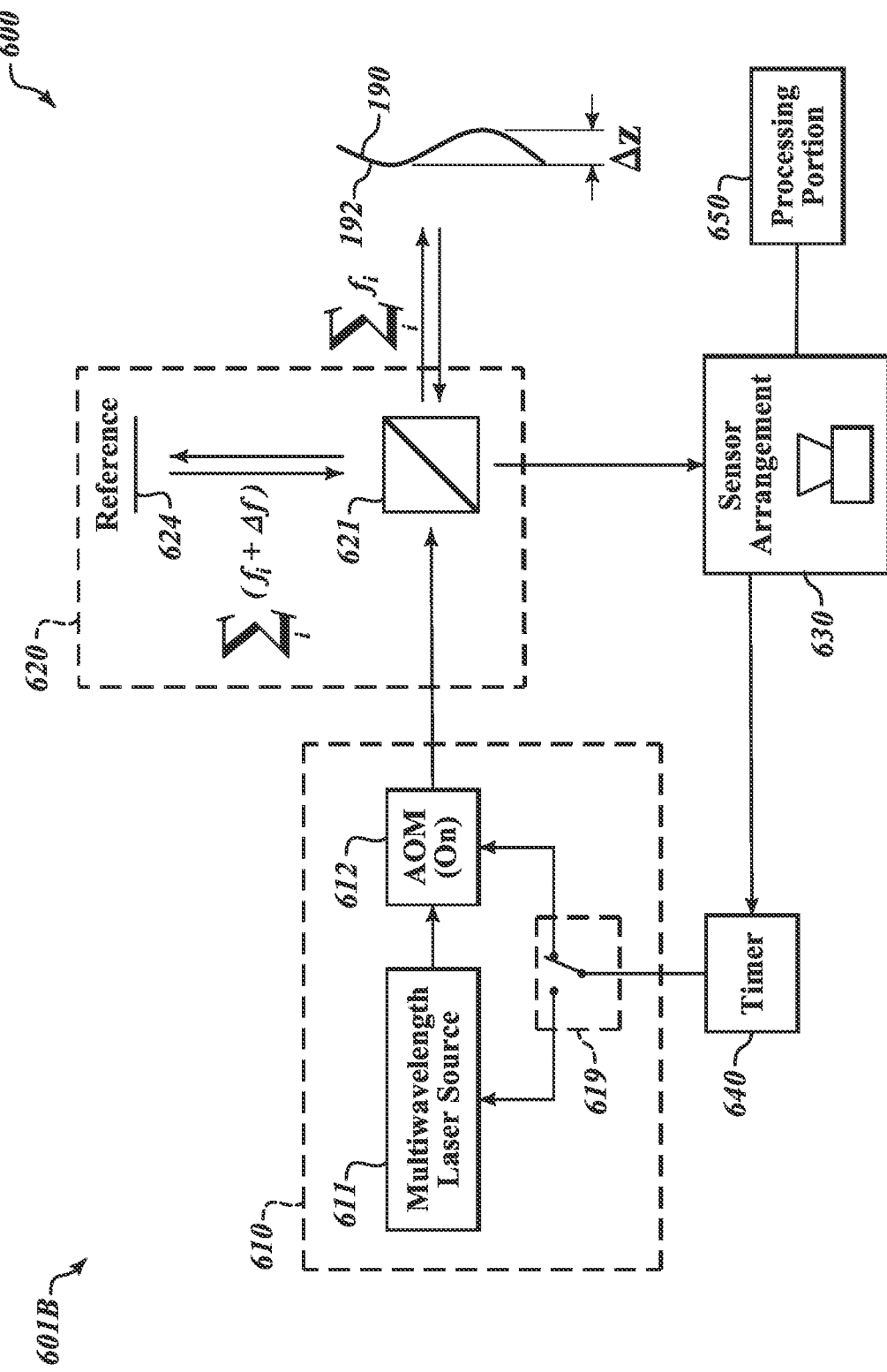

FIGS. 6A and 6B are diagrams illustrating different operating modes of a digital holography metrology system 600 such as that disclosed herein. The digital holography metrology system 600 is similar to the digital holography metrology systems 200 and 300 of FIGS. 2 and 3A-3C, except as otherwise described below. Only certain portions of the digital holography metrology system 600 are illustrated in FIGS. 6A and 6B, for simplicity in relation to describing the relevant operating principles of the different modes. As illustrated in FIGS. 6A and 6B, the digital holography metrology system 600 includes a heterodyne light source 610, an interferometric optical arrangement 620, a sensor arrangement 630, a timer 640 and a processing portion 650. The heterodyne light source 610 includes a multiwavelength laser light source 611 and an acousto-optic modulator (AOM) 612 (e.g., for which similar components are described as being included in the heterodyne light source 210 of FIG. 2). One difference from the digital holography metrology system 200 of FIG. 2, is that the digital holography metrology system 600 includes a switch 619 (e.g., included in the heterodyne light source 610 or otherwise) for switching between the different modes, as will be described in more detail below.

FIG. 6A illustrates the digital holography metrology system 600 operating in an amplitude modulated continuous wave (AMCW) mode 601A, while FIG. 6B illustrates the digital holography metrology system 600 operating in a digital holography mode 601B (e.g., for which the switch 619 is utilized as part of the switching between the modes). As will be described in more detail below, the AMCW mode 601A may be characterized as providing a relatively coarse scale measurement (e.g., utilizing one or more of the sensors TOF to perform certain time-of-flight measurement operations), while the digital holography mode 601B (e.g., which may operate such as described above with respect to FIGS. 2 and 3A-3C) may be characterized as providing a relatively fine scale measurement, for which the measurements of the two modes may be combined to provide high accuracy measurements over a relatively large non-ambiguity range.

As illustrated in FIG. 6A, for the AMCW mode 601A, the switch 619 couples the timer 640 (e.g., which provides a clock signal) to the multiwavelength laser light source 611 (e.g., as coupled to a current source of the multiwavelength laser light source 611) to modulate the intensity of the light. The acousto-optic modulator 612 does not receive the clock signal from the timer 640 and in various implementations remains off. Light from the multiwavelength laser light source 611 thus passes through the acousto-optic modulator 612 (e.g., as zero order light). It will be appreciated that in accordance with the operations in this example, no reference beams are directed by a beam splitter 621 toward a reference mirror 624. Instead, the zero order light passing through the acousto-optic modulator 612 passes through the beamsplitter 621 and illuminates the surface 192 of the workpiece 190 which in accordance with the reflected light is imaged by the optical arrangement 620 (e.g., toward the sensor arrangement 630 as directed by the beamsplitter 621). One or more of the sensors TOF (e.g., see FIG. 2) of the sensor arrangement 630 measure distances/surface heights of the surface points on the workpiece surface 192 via homodyne detection. In accordance with such operations of one or more of the sensors TOF, a relatively coarse measurement range may be achieved (e.g., including a non-ambiguity range of approximately 1.5 meters in one specific example implementation, with a potential distance error of approximately 0.5% at such distances corresponding to approximately 7.5 mm).

Such operations of the AMCW mode 601A thus effectively provide a coarse scale measurement, for which the digital holography mode 601B of FIG. 6B may be utilized to provide a fine scale measurement that can resolve a potential distance error of the course scale measurement of FIG. 6A, such as with a non-ambiguity range that is larger than the potential distance error (e.g., a non-ambiguity range larger than 7.5 mm in this example). For the digital holography mode 601B, the switch 619 couples the timer 640 to the acousto-optic modulator 612 which is turned on, and for which the digital holography metrology system 600 operates as described above with respect to FIGS. 2 and 3A-3C. In various implementations, the digital holography metrology system 600 may alternate between the modes 601A and 601B on a frame-by-frame basis, to achieve the desired measurements.

As noted above, in one specific example implementation of the configuration of FIG. 2 (i.e., for which the configuration of FIG. 6B operates similarly), utilization of a combination of wavelengths $\lambda_1=633$ nm, $\lambda_2=687$ nm and $\lambda_3=767$ nm, which may be achieved utilizing certain commercially available laser light sources, may result in certain implementations in a non-ambiguity range of approximately 8.82 mm. This is noted to be larger than the 7.5 mm potential error of the coarse scale measurement in the example above for the AMCW mode 601A. The measurements of the two modes in these examples may thus be combined to achieve a total non-ambiguity range of approximately 1.5 meters, with sub-micron accuracy. It will be appreciated that utilizing the two modes 601A and 601B enables the total non-ambiguity range to be extended (e.g., to 1.5 meters) without requiring additional laser light sources to be added. In one specific example, in order to achieve a similar increase in the non-ambiguity range utilizing only a digital holography mode, such as mode 601B, could require addition laser light sources (e.g., such as adding three additional laser light sources, such as for a total of six laser light sources for wavelengths $\lambda_1, \lambda_2, \lambda_3, \lambda_4, \lambda_5$ and $\lambda_6$). In comparison to such an alternative configuration, the utilization of the two modes 601A and 601B as illustrated in FIGS. 6A and 6B may result in a less complex and lower cost system (e.g., as utilizing and implementing measurements from only three laser light sources/wavelengths $\lambda_1, \lambda_2, \lambda_3$, rather than six, etc.).

In various implementations, different techniques may be utilized for combining the measurements of the AMCW mode 601A and the digital holography mode 601B. As noted above, in various implementations the AMCW mode 601A provides surface height data on a coarser scale and may in some instances primarily be used to resolve the ambiguities in unwrapping beyond the original holographic range. In one specific example implementation, $\alpha$=the non-ambiguity range of the measurements in the digital holography mode 601B, while z_AMCW=the surface height measurement of the AMCW mode 601A, and z_Holo=the holography z-height measurement of the digital holography mode 601B. A term I=floor(z_AMCW/$\alpha$) provides the integer multiple of the digital holography non-ambiguity range of the digital holography mode 601B (e.g., for which it is desirable for the measured height to be within the non-ambiguity range of the AMCW mode 601A). As noted above, in one specific example implementation, a modulation frequency of 100 MHz may correspond to an AMCW non-ambiguity range of 1.5 meters, for which the digital holography non-ambiguity range may be larger than the potential distance error (e.g., a non-ambiguity range larger than 7.5 mm in this example). The final z-height may be determined via $\Delta z = I \cdot \alpha + z\_Holo$. In accordance with this equation, in one example for determining a combined measurement distance to a first surface point on a workpiece, a first AMCW mode measurement distance provides an integer multiple of the digital holography non-ambiguity range, for which the integer multiple is combined with a first digital holography mode measurement distance to determine the combined measurement distance to the first surface point on the workpiece.

FIGS. 7-11 illustrate various implementations of a heterodyne light source (e.g., which may be utilized as the heterodyne light source 110 of FIG. 1 and/or the heterodyne light source 210 of FIG. 2, etc.). In various implementations, each of the configurations of FIGS. 7-10 may be characterized as an inline optical arrangement for co-propagating and cross polarized beams (e.g., from an acousto-optic modulator for heterodyne interferometry, etc.). More specifically, each of these implementations may be characterized as an inline optical arrangement for the purpose of combining orthogonally polarized output beams (e.g., from an acousto-optic modulator) into a single beam to be used as the output of the heterodyne light source. In the inline optical arrangements disclosed herein, the orthogonally polarized beams are noted to each travel through a same set of components of a source optical arrangement, with a birefringent optical element portion (i.e., including a birefringent optical element) combining the orthogonally polarized output beams into a single beam path as part of a single combined beam.

It will be appreciated that the implementations described below may have advantages over certain alternative implementations. For example, in one alternative implementation, fiber coupling may be utilized (e.g., where the output of the acousto-optic modulator may be focused by a lens into an optical fiber, such as a polarization maintaining optical fiber). However, such a configuration may have high coupling losses due to a combination of: a beam offset in a focal plane causing clipping; beam size/mode field diameter mismatch; and/or a limited fiber input numerical aperture (NA). In another alternative implementation, two polarizing beam splitters and reflectors may be utilized, for which a first beam from the acousto-optic modulator may be directed by the first beam splitter upward to be reflected by the first reflector to the second reflector, which reflects the first beam back down to the second beam splitter which directs the first beam forward, and for which a second beam from the acousto-optic modulator travels straight through the first and second beam splitters to co-propagate out of the configuration with the first beam. However, such a configuration may have mismatched beam parameters due to unequal path lengths (i.e., of the first and second beams), as well as not having a common beam path (i.e., travelling through different optical components), which may result in a lack of robustness. It will be appreciated that the implementations described below with respect to FIGS. 7-11 have certain advantages over such configurations.

Figure 7:
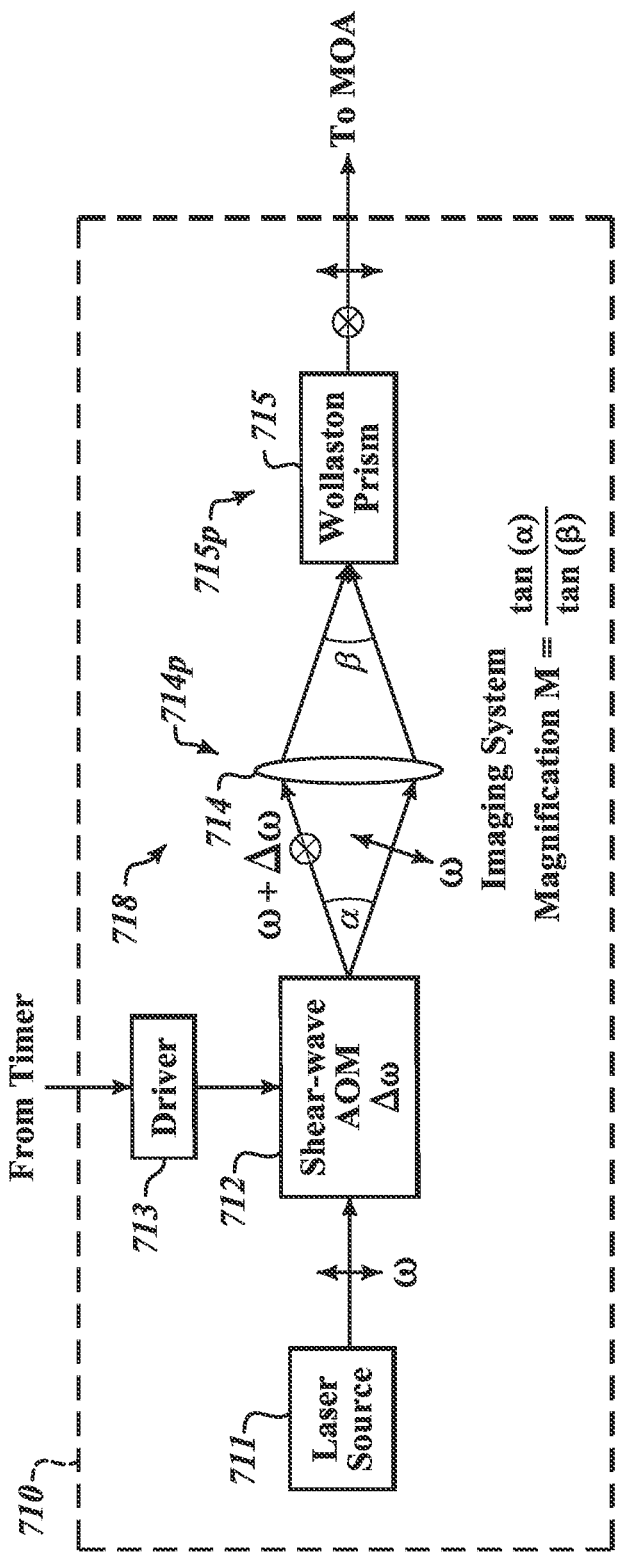
FIG. 7 is a diagram of a heterodyne light source including an imaging system with a single imaging lens and a Wollaston prism.

FIG. 7 is a diagram of a heterodyne light source 710 including a laser light source 711, an acousto-optic modulator 712, a driver 713 and a source optical arrangement 718 (i.e., which includes a receiving optical element portion 714p and a birefringent optical element portion 715p). The receiving optical element portion 714p includes an imaging system with a single imaging lens 714. The birefringent optical element portion 715p includes a Wollaston prism 715.

In operation, a timer (e.g., timer 140, timer 240, etc.) may provide a timing signal (e.g., a clock/reference signal) to the driver 713. The acousto-optic modulator 712 is then driven by the driver 713 at the modulation frequency $\Delta\omega$. The laser light source 711 may provide a first wavelength laser beam at a first frequency $\omega_1$ (i.e., with a corresponding first wavelength). The acousto-optic modulator 712 (e.g., a shear-wave AOM) receives the input first wavelength laser beam and produces/generates a corresponding first frequency shifted laser beam at a frequency $\omega_1+\Delta\omega$, which is orthogonally polarized relative to the input first wavelength laser beam. An object plane in the acousto-optic modulator 712 is imaged by the imaging lens 714 into the Wollaston prism 715 with a magnification M that is matched to both the separation angle $\alpha$ of the acousto-optic modulator 712 and the separation angle $\beta$ of the Wollaston prism 715, for which M=tan($\alpha$)/tan($\beta$). In accordance with the operating characteristics of the Wollaston prism 715, the output is a first combined beam which includes the combined first wavelength laser beam at the first frequency $\omega_1$ and the orthogonally polarized first frequency shifted laser beam at the frequency $\omega_1+\Delta w$.

The components of the heterodyne light source 710 (e.g., including the imaging lens 714 and the Wollaston prism 715) may thus be characterized as an inline optical arrangement for co-propagating and cross polarized beams. More specifically, the components may be characterized as an inline optical arrangement for the purpose of combining orthogonally polarized output beams into a single beam that is output from the heterodyne light source. As indicated in FIG. 7, the output of the heterodyne light source 710 may be provided to/received by a measurement optical arrangement MOA (e.g., measurement optical arrangement 120, 220, etc.), such as for being utilized for measurement operations (e.g., for determining at least one measurement distance to at least one surface point on a workpiece based on a measurement process that utilizes the first combined beam).

Figure 8:
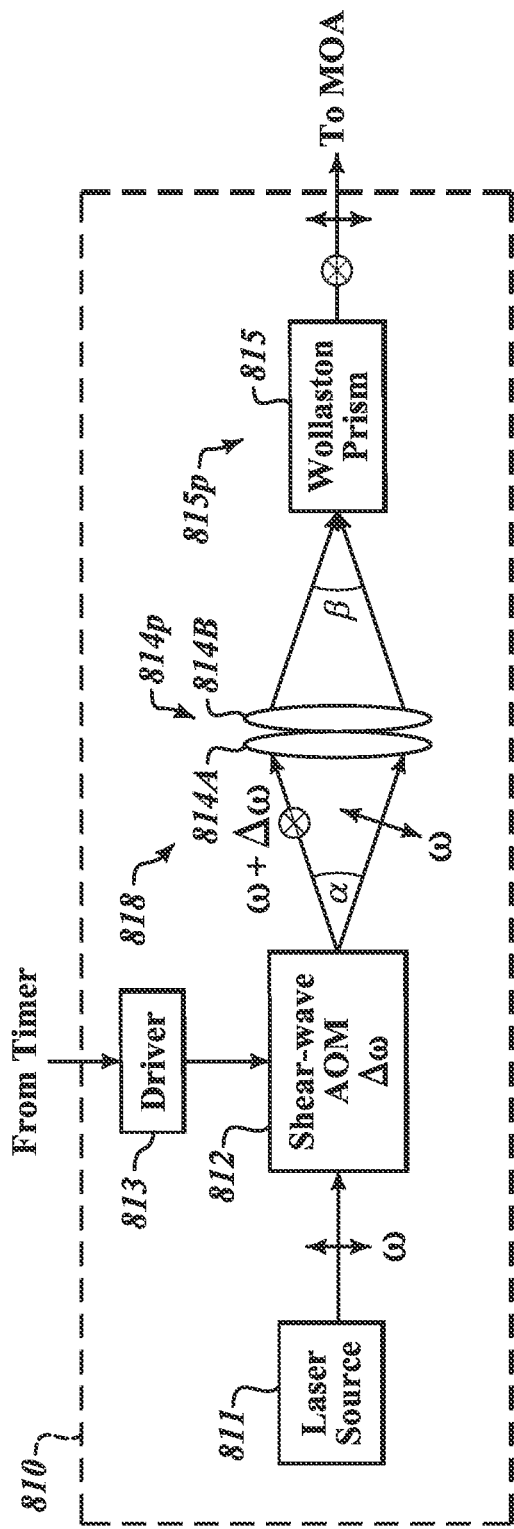
FIG. 8 is a diagram of a heterodyne light source including an imaging system with two imaging lenses and a Wollaston prism.

FIG. 8 is a diagram of a heterodyne light source 810 including a laser light source 811, an acousto-optic modulator 812, a driver 813 and a source optical arrangement 818 (i.e., which includes a receiving optical element portion 814p and a birefringent optical element portion 815p). The receiving optical element portion 814p includes an imaging system with two imaging lenses 814A and 814B. The birefringent optical element portion 815p includes a Wollaston prism 815. The heterodyne light source 810, as well as heterodyne light sources 910, 1010 and 1110 of FIGS. 9, 10 and 11, will be understood to operate similarly to the heterodyne light source 710 of FIG. 7, except as otherwise described below. In relation to the heterodyne light source 710 of FIG. 7 which has an imaging system with a single imaging lens 714, a primary difference of the heterodyne light source 810 of FIG. 8 is the inclusion of the imaging system with multiple lenses 814A and 814B, which may provide certain desirable operating characteristics for some applications, as will be described in more detail below.

In implementations where the laser light source 811 may be a multiwavelength laser light source, the diffraction angle $\alpha$ of the acousto-optic modulator 812 may be wavelength dependent, for which in a configuration such as that of FIG. 7 the beams with different wavelengths in some implementations may thus not co-propagate (e.g., which may result in beam clipping later in the configuration, etc.). To address such issues, the imaging system (i.e., including the lenses 814A and 814B) may be configured to be a chromatic imaging system, for which the magnification may be wavelength dependent, and may be matched to the diffraction angle $\alpha$ (i.e., for each wavelength) of the acousto-optic modulator 812 (e.g., so that the different wavelength laser beams will co-propagate and/or otherwise not experience beam clipping later in the configuration, etc.). More specifically, in accordance with this configuration, the object plane in the acousto-optic modulator 812 is imaged by the chromatic imaging system (i.e., including the imaging lenses 814A and 814B) into the Wollaston prism 815 with a magnification M that varies with each wavelength and is matched to both the separation angle $\alpha(\omega)$ of the acousto-optic modulator 812 and the separation angle $\beta(\omega)$ of the Wollaston prism 815 for each wavelength, for which M=tan($\alpha(\omega)$)/tan($\beta(\omega)$).

Figure 9:
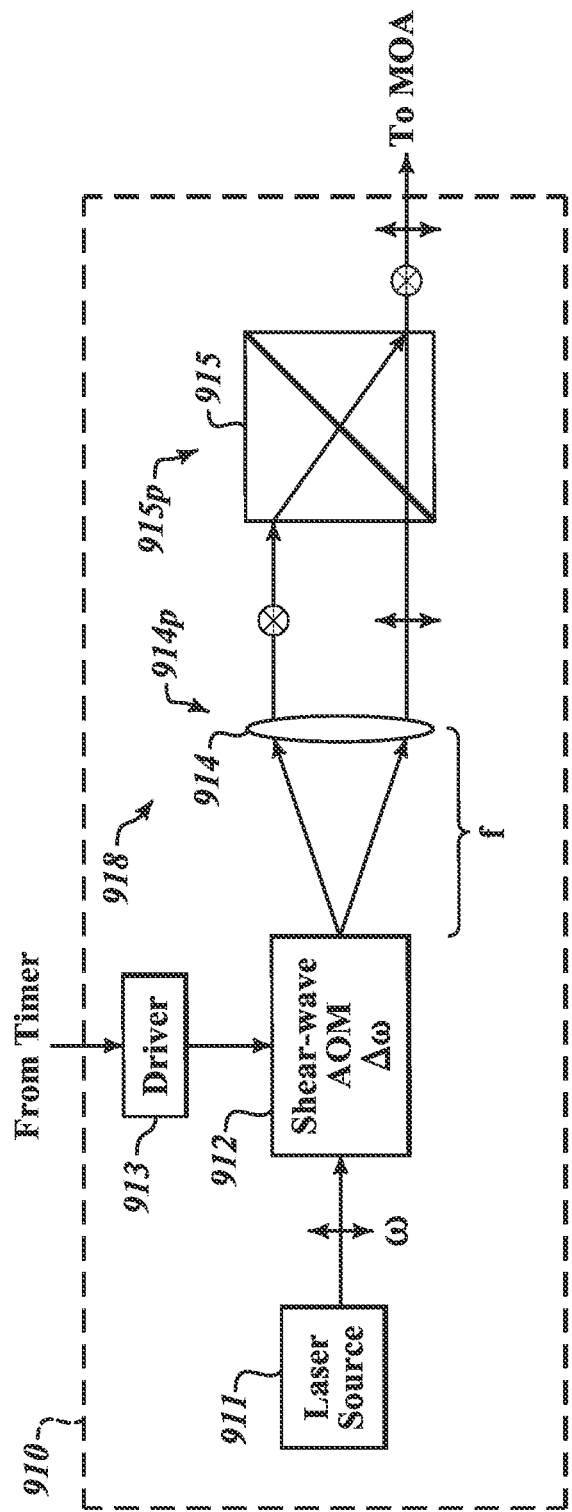
FIG. 9 is a diagram of a heterodyne light source including a receiving lens and a birefringent beam displacer.

FIG. 9 is a diagram of a heterodyne light source 910 including a laser light source 911, an acousto-optic modulator 912, a driver 913 and a source optical arrangement 918 (i.e., which includes a receiving optical element portion 914p and a birefringent optical element portion 915p). The receiving optical element portion 914p includes a receiving lens 914. The birefringent optical element portion 915p includes a birefringent beam displacer 915.

Similar to the operations described above with respect to FIG. 7, the acousto-optic modulator 912 (e.g., a shear-wave AOM) receives an input first wavelength laser beam and produces/generates a corresponding first frequency shifted laser beam, which is orthogonally polarized relative to the input first wavelength laser beam. The input lens 914 is focused (e.g., at a focal length f) into the acousto-optic modulator 912, and images out to infinity (i.e., for which the individual beams are collimated). In accordance with the operating characteristics of the birefringent beam displacer 915, the first wavelength laser beam passes through, while the first frequency shifted laser beam (i.e., which is orthogonally polarized) is effectively shifted to be output with the first wavelength laser beam. The output of the birefringent beam displacer 915 is thus a first combined beam which includes the combined first wavelength laser beam and the orthogonally polarized first frequency shifted laser beam.

The components of the heterodyne light source 910 (e.g., including the imaging lens 914 and the birefringent beam displacer 915) may thus be characterized as an inline optical arrangement for co-propagating and cross polarized beams. More specifically, the components may be characterized as an inline optical arrangement for the purpose of combining orthogonally polarized output beams into a single beam that is output from the heterodyne light source. As indicated in FIG. 9, the output of the heterodyne light source 910 may be provided to/received by a measurement optical arrangement MOA (e.g., measurement optical arrangement 120, 220, etc.), such as for being utilized for measurement operations (e.g., for determining at least one measurement distance to at least one surface point on a workpiece based on a measurement process that utilizes the first combined beam).

Figure 10:
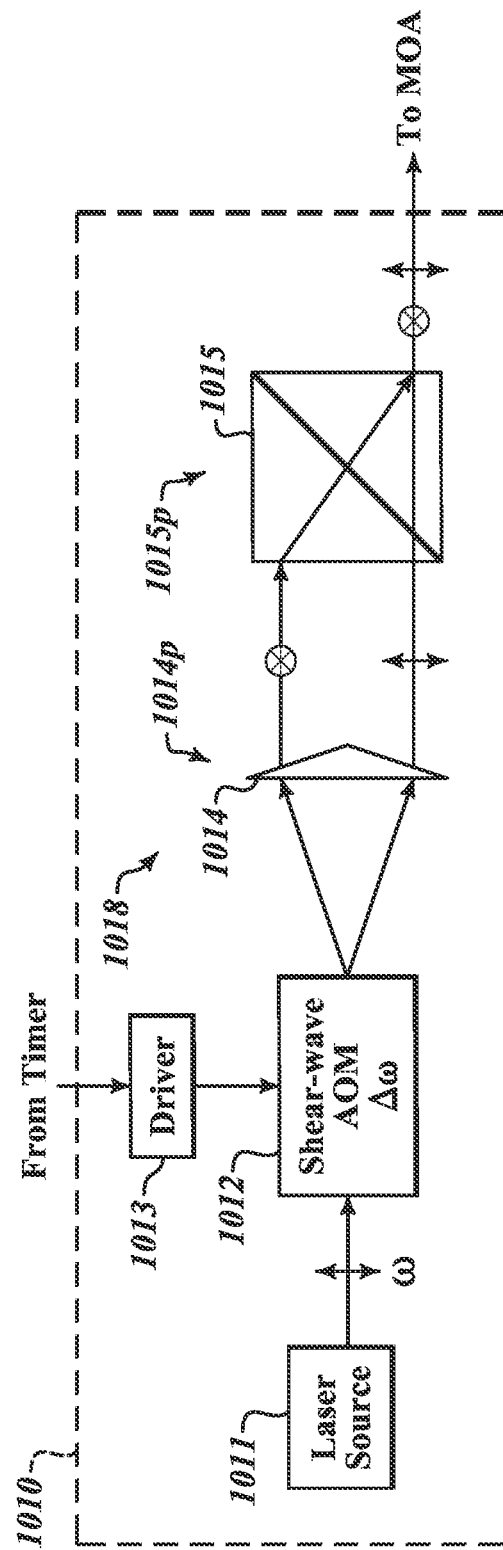
FIG. 10 is a diagram of a heterodyne light source including a receiving prism and a birefringent beam displacer.

FIG. 10 is a diagram of a heterodyne light source 1010 including a laser light source 1011, an acousto-optic modulator 1012, a driver 1013 and a source optical arrangement 1018 (i.e., which includes a receiving optical element portion 1014p and a birefringent optical element portion 1015p). The receiving optical element portion 1014p includes a receiving prism 1014. The birefringent optical element portion 1015p includes a birefringent beam displacer 1015. The heterodyne light source 1010 will be understood to operate similarly to the heterodyne light source 910 of FIG. 9, except as otherwise described below. In relation to the heterodyne light source 910 of FIG. 9 which has a receiving lens 914, a primary difference of the heterodyne light source 1010 of FIG. 10 is the alternative inclusion of a receiving prism 1014, for which the beams may correspondingly be combined without imaging. In various implementations, for the receiving prism 1014, the prism apex angle (e.g., and in some implementations the number of vertices) may be matched to the separation angle of the acousto-optic modulator 1012 and the input wavelength laser beam(s).

As noted above, the implementations of FIGS. 7-10 have certain similar operating characteristics. In each configuration, a source optical arrangement (e.g., the source optical arrangement 718, 818, 918 or 1018) receives and combines at least a first wavelength laser beam and a first frequency shifted laser beam from the acousto-optic modulator and outputs a corresponding first combined beam. In each configuration, the source optical arrangement includes a receiving optical element portion (e.g., including at least one receiving optical element, such as the respective lenses 714, 814A and 814B, 914 and the prism 1014) and a birefringent optical element portion (e.g., including at least one birefringent optical element, such as the respective Wollaston prisms 715 and 815 and the respective birefringent beam displacers 915 and 1015). It will be appreciated that in other implementations, alternative birefringent optical elements may be utilized (e.g., a Rochon prism, etc.). In each configuration, the receiving optical element portion is configured to receive the first wavelength laser beam and the first frequency shifted laser beam and to direct the beams along an optical path toward the birefringent optical element portion. The birefringent optical element portion is configured to receive the first wavelength laser beam and the first frequency shifted laser beam and combine the beams to output the corresponding first combined beam.

It will be appreciated that the birefringent optical element of each of the configurations of FIGS. 7-10 (e.g., including the respective Wollaston prisms 715 and 815 and the respective birefringent beam displacers 915 and 1015), may in various implementations each be characterized as being utilized in a reverse/backward orientation relative to certain other uses of such components. More specifically, such birefringent optical elements are more typically utilized to receive a beam and/or co-propagating beams along an optical path on one side and then to divide the beams to be provided as outputs. In contrast to such prior uses, in accordance with the configurations of FIGS. 7-10, the respective birefringent optical elements are each utilized to receive the different beams, and then to combine the beams to be output as parts of a single combined beam (e.g., including the co-propagating beams). As noted above, the implementations of FIGS. 7-10 are thus each configured as an inline optical arrangement for the purpose of combining orthogonally polarized output beams into a single beam that is output from the heterodyne light source. As indicated in FIGS. 7-10, the output of each heterodyne light source may be provided to/received by a measurement optical arrangement MOA (e.g., measurement optical arrangement 120, 220, etc.), such as for being utilized for measurement operations (e.g., for determining at least one measurement distance to at least one surface point on a workpiece based on a measurement process that utilizes the combined beam).

Figure 11:
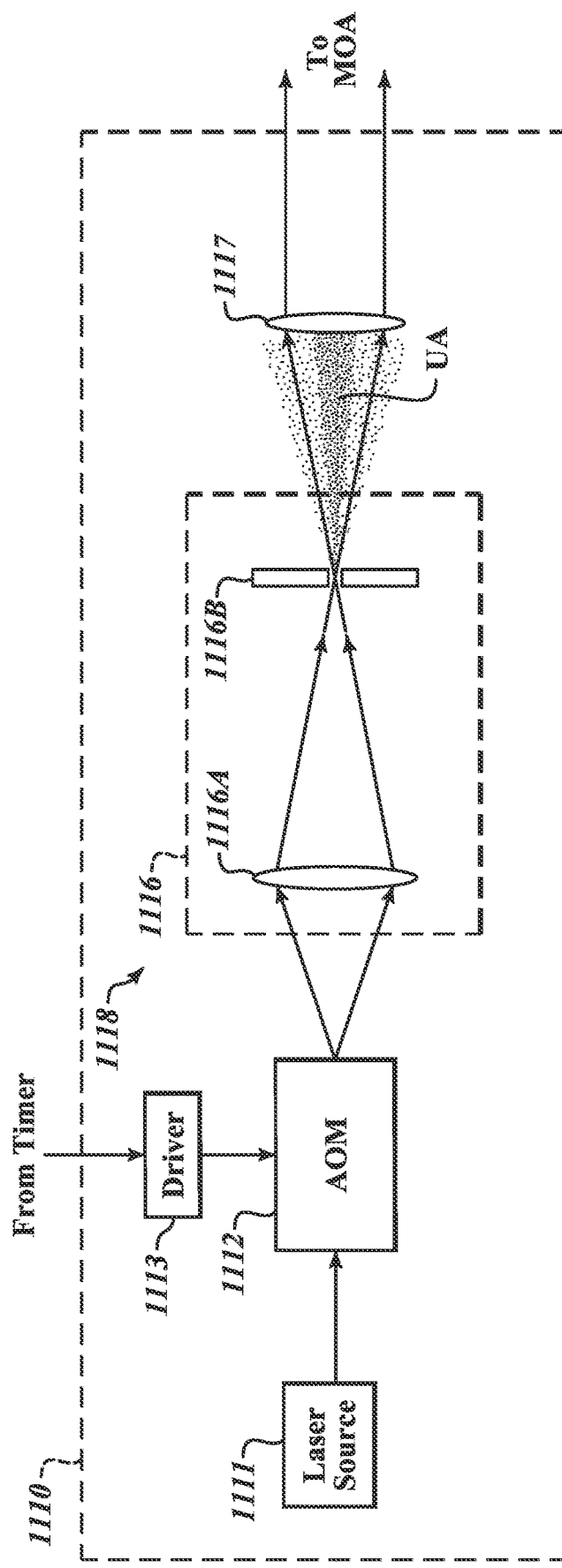
FIG. 11 is a diagram of a heterodyne light source including a spatial filtering configuration and a collimation lens.

FIG. 11 is a diagram of a heterodyne light source 1110 including a laser light source 1111, an acousto-optic modulator 1112, a driver 1113 and a source optical arrangement 1118 (i.e., which includes a spatial filtering configuration 1116 and a collimation lens 1117). In various implementations, the laser light source 1111 may be a multiwavelength laser light source (e.g., providing first, second, third, etc., wavelength laser beams), and the acousto-optic modulator 1112 may correspondingly produce combined beams, as described herein. In various implementations, the combined beams (e.g., including the first, second, third, etc., combined beams) from the acousto-optic modulator 1112 may pass through the spatial filtering configuration 1116 and the collimation lens 1117 on a path to a measurement optical arrangement MOA. In accordance with principles of momentum conservation, different wavelengths may be diffracted at different angles by the operation of the acousto-optic modulator 1112. In one implementation, the spatial filtering configuration 1116 may include a microscope objective lens 1116A and a pinhole filter element 1116B, for which the combined beams from the acousto-optic modulator 1112 may be imaged by the objective lens 1116A onto the pinhole filter element 1116B (e.g., comprising a 10 um pinhole) such that diffracted and undiffracted beams of different wavelengths overlap, and the light exiting the pinhole filter element 1116B is effectively a point-source for providing the beams to the collimation lens 1117 (e.g., with a usable overlap area UA such as is indicated in FIG. 11). After the combined beams (e.g., including the first, second, third, etc., combined beams) pass through the spatial filtering configuration 1116, the collimation lens 1117 operates to collimate the combined beams.

In general, a multiwavelength laser light source may be utilized in various configurations of the implementations of FIGS. 7-11 (e.g., in particular as described above with respect to FIGS. 8 and 11, although as also may be utilized in other of the configurations). The following description of the operations of a multiwavelength laser light source is provided in relation to the multiwavelength laser light source 1111 of FIG. 11, although it will be appreciated that this description may also apply to any of the configurations of FIGS. 7-10, when correspondingly utilizing a multiwavelength laser light source. In one example implementation, the multiwavelength laser light source 1111 may provide a first wavelength laser beam at a first frequency $\omega_1$ (i.e., with a corresponding first wavelength), for which the acousto-optic modulator 1112 receives the first wavelength laser beam and generates a corresponding first frequency shifted laser beam at the frequency $\omega_1+\Delta\omega$. Similarly, the multiwavelength laser light source 1111 may provide a second wavelength laser beam at a second frequency $\omega_2$ (i.e., with a corresponding second wavelength), for which the acousto-optic modulator 1112 receives the second wavelength laser beam and generates a corresponding second frequency shifted laser beam at the frequency $\omega_2+\Delta\omega$. Similarly, the multiwavelength laser light source 1111 may provide a third wavelength laser beam at a third frequency $\omega_3$ (i.e., with a corresponding third wavelength), for which the acousto-optic modulator 1112 receives the third wavelength laser beam and generates a corresponding third frequency shifted laser beam at the frequency $\omega_3+\Delta\omega$. In various implementations, the multiwavelength laser light source 1111 may provide additional, or fewer, wavelength laser beams (e.g., with the acousto-optic modulator 1112 generating corresponding additional, or fewer, frequency shifted laser beams). In general for the operation of the acousto-optic modulator 1112, it will be appreciated that the phase shift $\Delta\omega$ on the acoustic wave produces an optical phase shift on all beams independent of wavelength by the same amount $\Delta\omega$. For such operations, in various implementations it may be desirable for the driver 1113 to be a phase-locked radio frequency (RF) driver.

As noted above, a timer is coupled to the driver 1113 of the acousto-optic modulator 1112 to provide the reference clock signal on the basis of which the modulation frequency $\Delta\omega$ is generated in the driver 1113. In one implementation, the clock signal is provided at the modulation frequency $\Delta\omega$ (e.g., in a range of 40 MHz-100 MHz). The distributed clock signal may be equivalent to the frequency of the acoustic wave in the acousto-optic modulator 1112 and equivalent to the frequency shift $\Delta\omega$ of the optical beam (e.g., photon frequency plus one acoustic phonon). In various alternative implementations, the distributed clock signal may be any other frequency and then multiplied/divided to the desired target frequency with additional electronic components.

In this example, each frequency shifted laser beam is obtained by acousto-optic modulation of a corresponding wavelength laser beam. Certain advantages of this configuration include that multiple wavelengths may be provided, all with the same frequency shift and which may also be phase locked, and for which the overall configuration (e.g., relative to certain prior configurations) may be relatively less complex and may be of lower cost. In various alternative configurations, each frequency shifted laser beam may be obtained using other approaches. For instance, for each source/frequency shifted laser beam pair, the laser may be a Zeeman laser having a lasing medium provided in a strong axial magnetic field to produce two beams having different frequencies. In various other alternative implementations, an electro-optic modulator may be utilized instead of an acousto-optic modulator, or a combination of multiple dual-wavelength sources (e.g., lasers that run on two wavelengths simultaneously) may be utilized.

In various implementations, the multiwavelength laser light source 1111 may, in some configurations, include individual laser light sources for providing the laser beams with the different wavelengths. For example, different laser light sources may be included that provide a desired combination of wavelength ratios (e.g., in one specific example implementation providing wavelengths such as 633 nm, 687 nm and 767 nm). For example, in one implementation, a first laser light source included in the multiwavelength laser light source 1111 may provide a first wavelength laser beam (e.g., in one specific example implementation with a nominal wavelength at 633 nm). The heterodyne light source 1110 may correspondingly produce a first combined beam as described above as including a first wavelength laser beam having a first wavelength $\lambda_{S1}$ (e.g., 633 nm) with a vertical polarization and a first frequency shifted laser beam having a wavelength $\lambda_{FS1}$ with a horizontal polarization (e.g., each with linear polarization). The timer produces a clock signal (e.g., at 40 MHz) that sets the driving frequency (e.g., of the driver 1113) of the acousto-optic modulator 1112. As a result, the first combined beam results in a detected beat signal (e.g., of 40 MHz).

Similarly, a second laser light source included in the multiwavelength laser light source 1111 may provide a second wavelength laser beam (e.g., in one specific example implementation with a nominal wavelength at 687 nm). The heterodyne light source 1110 may correspondingly produce a second combined beam as described above as including a second wavelength laser beam having a second wavelength $\lambda_{S2}$ (e.g., 687 nm) with a vertical polarization and a second frequency shifted laser beam having a wavelength $\lambda_{FS2}$ with a horizontal polarization (e.g., each with linear polarization). Similarly, a third laser light source included in the multiwavelength laser light source 1111 may provide a third wavelength laser beam (e.g., in one specific example implementation with a nominal wavelength at 767 nm). The heterodyne light source 1110 may correspondingly produce a third combined beam as described above as including a third wavelength laser beam having a third wavelength $\lambda_{S3}$ (e.g., 767 nm) with a vertical polarization and a third frequency shifted laser beam having a wavelength $\lambda_{FS3}$ with a horizontal polarization (e.g., each with linear polarization). As noted above, the timer may produce a clock signal (e.g., at 40 MHz) that sets the driving frequency (e.g., of the driver 1113) of the acousto-optic modulator 1112. As a result, each of the second and third combined beams generates a detected beat signal at the modulation frequency (e.g., of 40 MHz). In various implementations, it may be desirable for any individual laser light sources that are utilized to have narrow linewidths (e.g., for having long coherence lengths).

Figure 12:
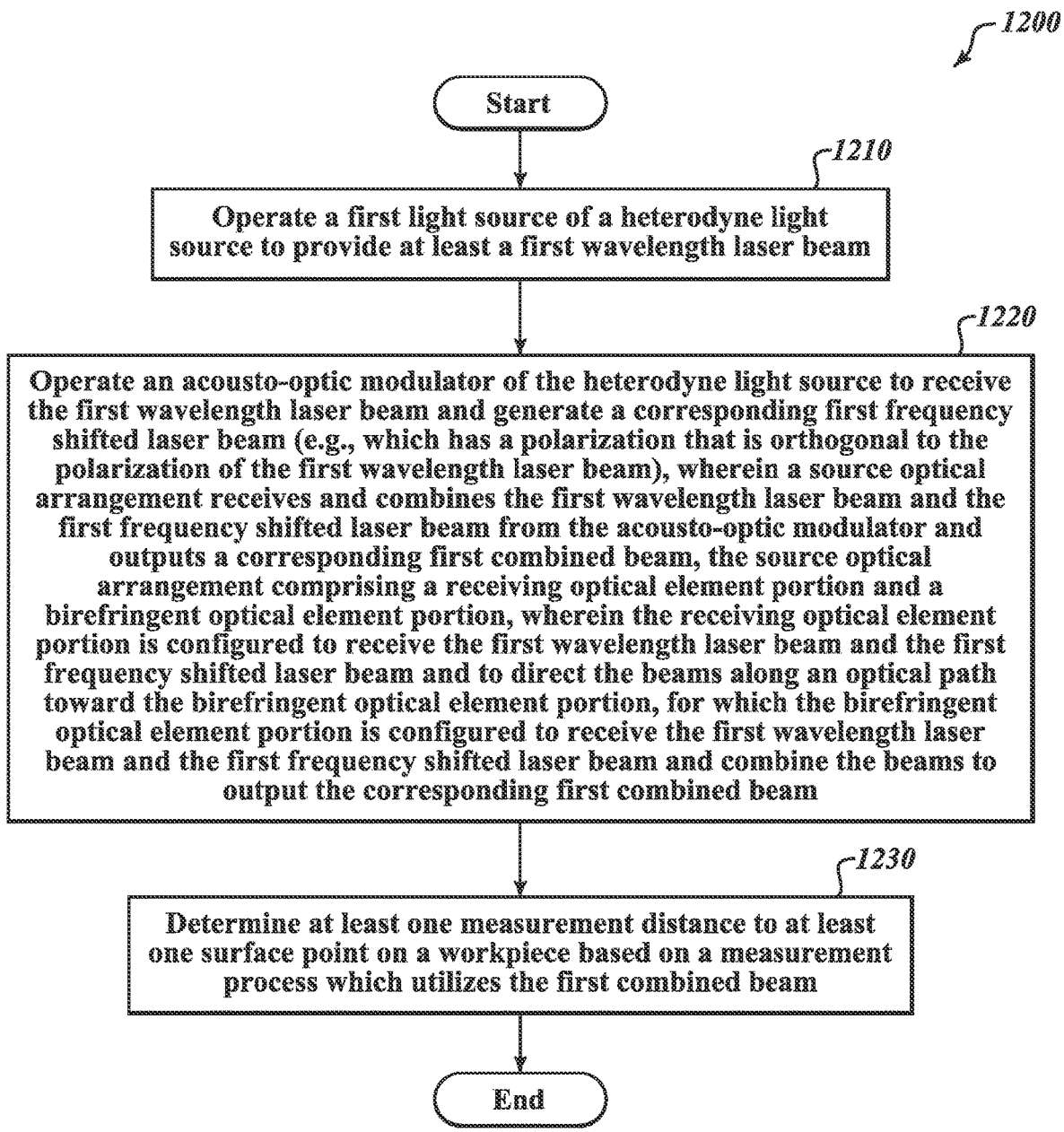
FIG. 12 is a flow diagram illustrating an exemplary implementation of a routine for operating a heterodyne light source.

FIG. 12 is a flow diagram illustrating an exemplary implementation of a routine 1200 for operating a heterodyne light source. At a block 1210, a first light source of a heterodyne light source is operated to provide at least a first wavelength laser beam. At a block 1220, an acousto-optic modulator of the heterodyne light source is operated to receive the first wavelength laser beam and generate a corresponding first frequency shifted laser beam (e.g., which has a polarization that is orthogonal to the polarization of the first wavelength laser beam). In various implementations, a source optical arrangement receives and combines the first wavelength laser beam and the first frequency shifted laser beam from the acousto-optic modulator and outputs a corresponding first combined beam. The source optical arrangement includes a receiving optical element portion and a birefringent optical element portion. The receiving optical element portion is configured to receive the first wavelength laser beam and the first frequency shifted laser beam and to direct the beams along an optical path toward the birefringent optical element portion. The birefringent optical element portion is configured to receive the first wavelength laser beam and the first frequency shifted laser beam and combine the beams to output the corresponding first combined beam (e.g., to a measurement optical arrangement). At a block 1230, at least one measurement distance is determined to at least one surface point on a workpiece based on a measurement process which utilizes the first combined beam.

Figure 13:
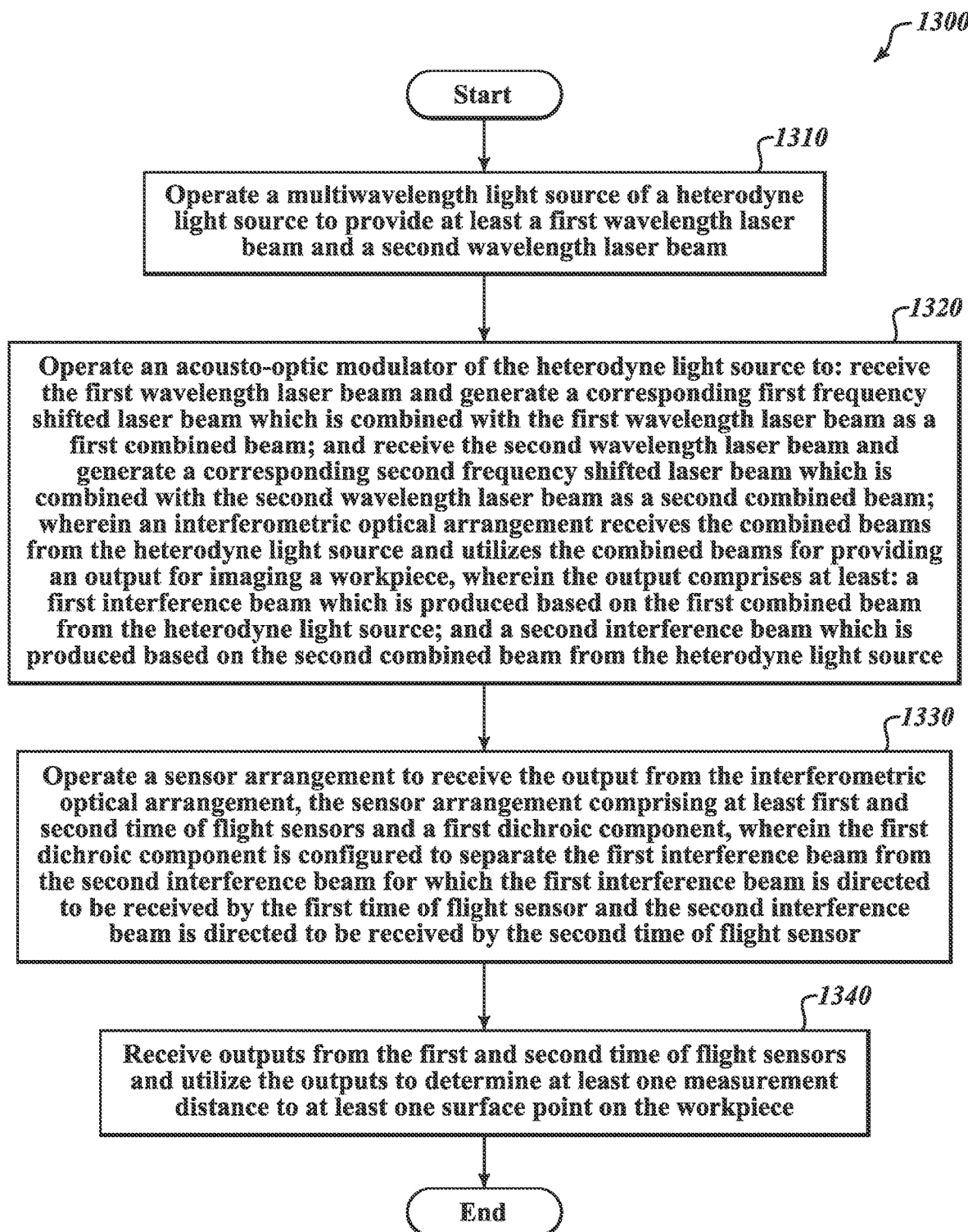
FIG. 13 is a flow diagram illustrating an exemplary implementation of a routine for operating a digital holography metrology system including a heterodyne light source.

FIG. 13 is a flow diagram illustrating an exemplary implementation of a routine 1300 for operating a digital holography metrology system which includes a heterodyne light source. At a block 1310, a multiwavelength light source (e.g., a multiwavelength laser light source) of a heterodyne light source is operated to provide at least a first wavelength laser beam and a second wavelength laser beam. At a block 1320, an acousto-optic modulator of the heterodyne light source is operated to: receive the first wavelength laser beam and generate a corresponding first frequency shifted laser beam which is combined with the first wavelength laser beam as a first combined beam; and receive the second wavelength laser beam and generate a corresponding second frequency shifted laser beam which is combined with the second wavelength laser beam as a second combined beam. An interferometric optical arrangement receives the combined beams from the heterodyne light source and utilizes the combined beams for providing an output for imaging a workpiece. The output comprises at least: a first interference beam which is produced based on the first combined beam from the heterodyne light source; and a second interference beam which is produced based on the second combined beam from the heterodyne light source.

At a block 1330, a sensor arrangement is operated to receive the output from the interferometric optical arrangement. The sensor arrangement comprises at least first and second time of flight sensors and a first dichroic component. The first dichroic component is configured to separate the first interference beam from the second interference beam for which the first interference beam is directed to be received by the first time of flight sensor and the second interference beam is directed to be received by the second time of flight sensor. At a block 1340, outputs are received from the first and second time of flight sensors and the outputs are utilized to determine at least one measurement distance to at least one surface point on the workpiece.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A metrology system, comprising:
a heterodyne light source, comprising:
a multiwavelength laser light source for providing at least a first wavelength laser beam at a first frequency, a second wavelength laser beam at a second frequency and a third wavelength laser beam at a third frequency, wherein the second frequency is different than the first frequency and the third frequency is different than the first and second frequencies;
an acousto-optic modulator which is configured to:
receive the first wavelength laser beam and generate a corresponding first frequency shifted laser beam with a polarization that is rotated relative to a polarization of the first wavelength laser beam;
receive the second wavelength laser beam and generate a corresponding second frequency shifted laser beam with a polarization that is rotated relative to a polarization of the second wavelength laser beam; and
receive the third wavelength laser beam and generate a corresponding third frequency shifted laser beam with a polarization that is rotated relative to a polarization of the third wavelength laser beam; and
a source optical arrangement which is configured to:
receive and combine the first wavelength laser beam and the first frequency shifted laser beam from the acousto-optic modulator and output a corresponding first combined beam, the source optical arrangement comprising a receiving optical element portion and a birefringent optical element portion, wherein the receiving optical element portion comprises a receiving optical element which the first wavelength laser beam and the first frequency shifted laser beam travel through and for which the receiving optical element portion is configured to receive the first wavelength laser beam and the first frequency shifted laser beam and to direct the beams along an optical path toward the birefringent optical element portion, and the birefringent optical element portion comprises a birefringent optical element which the first wavelength laser beam and the first frequency shifted laser beam travel through and for which the birefringent optical element portion is configured to receive the first wavelength laser beam and the first frequency shifted laser beam and combine the beams to output the corresponding first combined beam;
receive and combine the second wavelength laser beam and the second frequency shifted laser beam from the acousto-optic modulator and output a corresponding second combined beam, wherein the receiving optical element portion is configured to receive the second wavelength laser beam and the second frequency shifted laser beam and to direct the beams along the optical path toward the birefringent optical element portion, for which the birefringent optical element portion is configured to receive the second wavelength laser beam and the second frequency shifted laser beam and combine the beams to output the corresponding second combined beam with the first combined beam; and
receive and combine the third wavelength laser beam and the third frequency shifted laser beam from the acousto-optic modulator and output a corresponding third combined beam, wherein the receiving optical element portion is configured to receive the third wavelength laser beam and the third frequency shifted laser beam and to direct the beams along the optical path toward the birefringent optical element portion, for which the birefringent optical element portion is configured to receive the third wavelength laser beam and the third frequency shifted laser beam and combine the beams to output the corresponding third combined beam with the first and second combined beams; and a processing portion that is configured to determine a measurement distance to a surface point on a workpiece, wherein the determination of the measurement distance to the surface point on the workpiece is based on a measurement process which utilizes the first combined beam, the second combined beam and the third combined beam.

2. The metrology system of claim 1, further comprising:
a measurement optical arrangement which is configured to receive the first combined beam, the second combined beam and the third combined beam, and to utilize the first combined beam, the second combined beam and the third combined beam for providing an optical arrangement output that is related to the distance to the surface point on the workpiece; and
a sensor arrangement which is configured to receive the optical arrangement output and to produce a corresponding sensor arrangement output,
wherein the processing portion receives the sensor arrangement output and utilizes the sensor arrangement output as part of the measurement process to determine the measurement distance to the surface point on the workpiece.

3. The metrology system of claim 1, wherein the source optical arrangement including the receiving optical element portion and the birefringent optical element portion is arranged as an inline optical arrangement, for which the first wavelength laser beam and the first frequency shifted laser beam are orthogonally polarized and each travel through the receiving optical element of the receiving optical element portion and the birefringent optical element of the birefringent optical element portion, with the birefringent optical element combining the orthogonally polarized first wavelength laser beam and first frequency shifted laser beam into the first combined beam.

4. The metrology system of claim 3, wherein:
the second wavelength laser beam and the second frequency shifted laser beam are orthogonally polarized and each travel through the receiving optical element of the receiving optical element portion and the birefringent optical element of the birefringent optical element portion, with the birefringent optical element combining the orthogonally polarized second wavelength laser beam and second frequency shifted laser beam into the second combined beam; and
the third wavelength laser beam and the third frequency shifted laser beam are orthogonally polarized and each travel through the receiving optical element of the receiving optical element portion and the birefringent optical element of the birefringent optical element portion, with the birefringent optical element combining the orthogonally polarized third wavelength laser beam and third frequency shifted laser beam into the third combined beam.

5. The metrology system of claim 1, wherein the receiving optical element comprises an imaging lens, for which an object plane in the acousto-optic modulator is imaged into the birefringent optical element portion with a magnification that is matched to separation angles of both the acousto-optic modulator and the birefringent optical element portion.

6. The metrology system of claim 1, wherein the receiving optical element portion comprises a plurality of imaging lenses forming a chromatic imaging system, for which the receiving optical element comprises at least one of the imaging lenses and an object plane in the acousto-optic modulator is imaged into the birefringent optical element portion with a magnification that is matched to separation angles of both the acousto-optic modulator and the birefringent optical element portion for both the first and second wavelengths of the first and second wavelength laser beams, respectively.

7. The metrology system of claim 1, wherein the receiving optical element comprises a prism.

8. The metrology system of claim 1, wherein the birefringent optical element comprises at least one of a birefringent beam displacer, a Wollaston prism, or a Rochon prism.

9. A method for operating a metrology system including a heterodyne light source, the method comprising:
operating a multiwavelength laser light source of the heterodyne light source to provide at least a first wavelength laser beam at a first frequency;
operating an acousto-optic modulator of the heterodyne light source to receive the first wavelength laser beam and generate a corresponding first frequency shifted laser beam with a polarization that is rotated relative to a polarization of the first wavelength laser beam, wherein a source optical arrangement receives and combines the first wavelength laser beam and the first frequency shifted laser beam from the acousto-optic modulator and outputs a corresponding first combined beam, the source optical arrangement comprising a receiving optical element portion and a birefringent optical element portion, wherein the receiving optical element portion comprises a receiving optical element which the first wavelength laser beam and the first frequency shifted laser beam travel through and for which the receiving optical element portion receives the first wavelength laser beam and the first frequency shifted laser beam and directs the beams along an optical path toward the birefringent optical element portion, and the birefringent optical element portion comprises a birefringent optical element which the first wavelength laser beam and the first frequency shifted laser beam travel through and for which the birefringent optical element portion receives the first wavelength laser beam and the first frequency shifted laser beam and combines the beams to output the corresponding first combined beam;
operating the multiwavelength light source to provide at least a second wavelength laser beam at a second frequency which is different than the first frequency;
operating the acousto-optic modulator to receive the second wavelength laser beam and generate a corresponding second frequency shifted laser beam with a polarization that is rotated relative to a polarization of the second wavelength laser beam, wherein the source optical arrangement receives and combines the second wavelength laser beam and the second frequency shifted laser beam from the acousto-optic modulator and outputs a corresponding second combined beam, wherein the receiving optical element portion receives the second wavelength laser beam and the second frequency shifted laser beam and directs the beams along an optical path toward the birefringent optical element portion, for which the birefringent optical element portion receives the second wavelength laser beam and the second frequency shifted laser beam and combines the beams to output the corresponding second combined beam with the first combined beam;

operating the multiwavelength light source to provide at least a third wavelength laser beam at a third frequency which is different than the first frequency and the second frequency;

operating the acousto-optic modulator to receive the third wavelength laser beam and generate a corresponding third frequency shifted laser beam with a polarization that is rotated relative to a polarization of the third wavelength laser beam, wherein the source optical arrangement receives and combines the third wavelength laser beam and the third frequency shifted laser beam from the acousto-optic modulator and outputs a corresponding third combined beam, wherein the receiving optical element portion receives the third wavelength laser beam and the third frequency shifted laser beam and directs the beams along an optical path toward the birefringent optical element portion, for which the birefringent optical element portion receives the third wavelength laser beam and the third frequency shifted laser beam and combines the beams to output the corresponding third combined beam with the first combined beam; and determining a measurement distance to a surface point on a workpiece based on a measurement process which utilizes the first combined beam, the second combined beam and the third combined beam.

10. The method of claim 9, further comprising:
operating a sensor arrangement which is configured to receive an optical arrangement output and to produce a corresponding sensor arrangement output, wherein the optical arrangement output is provided by a measurement optical arrangement which is configured to receive the first combined beam and to utilize the first combined beam for providing the optical arrangement output that is related to the distance to the at least one surface point on the workpiece, wherein the determination of the at least one measurement distance to at least one surface point is based at least in part on the sensor arrangement output.

11. The method of claim 9, wherein the receiving optical element comprises an imaging lens, for which an object plane in the acousto-optic modulator is imaged into the birefringent optical element portion with a magnification that is matched to separation angles of both the acousto-optic modulator and the birefringent optical element portion.

12. The method of claim 9, wherein the receiving optical element portion comprises a plurality of imaging lenses forming a chromatic imaging system, for which the receiving optical element comprises at least one of the imaging lenses and an object plane in the acousto-optic modulator is imaged into the birefringent optical element portion with a magnification that is matched to separation angles of both the acousto-optic modulator and the birefringent optical element portion for both the first and second wavelengths of the first and second wavelength laser beams, respectively.

13. The method of claim 9, wherein the birefringent optical element comprises at least one of a birefringent beam displacer, a Wollaston prism, or a Rochon prism.

14. A heterodyne light source for use in a metrology system that determines measurement distances, the heterodyne light source comprising:
a multiwavelength laser light source for providing at least a first wavelength laser beam at a first frequency, a second wavelength laser beam at a second frequency and a third wavelength laser beam at a second frequency, wherein the second frequency is different than the first frequency and the third frequency is different than the first and second frequencies;
an acousto-optic modulator which is configured to:
receive the first wavelength laser beam and generate a corresponding first frequency shifted laser beam with a polarization that is rotated relative to a polarization of the first wavelength laser beam;
receive the second wavelength laser beam and generate a corresponding second frequency shifted laser beam with a polarization that is rotated relative to a polarization of the second wavelength laser beam; and
receive the third wavelength laser beam and generate a corresponding third frequency shifted laser beam with a polarization that is rotated relative to a polarization of the third wavelength laser beam; and
a source optical arrangement which is configured to:
receive and combine the first wavelength laser beam and the first frequency shifted laser beam from the acousto-optic modulator and output a corresponding first combined beam, the source optical arrangement comprising a receiving optical element portion and a birefringent optical element portion, wherein the receiving optical element portion comprises a receiving optical element which the first wavelength laser beam and the first frequency shifted laser beam travel through and for which the receiving optical element portion is configured to receive the first wavelength laser beam and the first frequency shifted laser beam and to direct the beams along an optical path toward the birefringent optical element portion, and the birefringent optical element portion comprises a birefringent optical element which the first wavelength laser beam and the first frequency shifted laser beam travel through and for which the birefringent optical element portion is configured to receive the first wavelength laser beam and the first frequency shifted laser beam and combine the beams to output the corresponding first combined beam;
receive and combine the second wavelength laser beam and the second frequency shifted laser beam from the acousto-optic modulator and output a corresponding second combined beam, wherein the receiving optical element portion is configured to receive the second wavelength laser beam and the second frequency shifted laser beam and to direct the beams along the optical path toward the birefringent optical element portion, for which the birefringent optical element portion is configured to receive the second wavelength laser beam and the second frequency shifted laser beam and combine the beams to output the corresponding second combined beam with the first combined beam; and
receive and combine the third wavelength laser beam and the third frequency shifted laser beam from the acousto-optic modulator and output a corresponding third combined beam, wherein the receiving optical element portion is configured to receive the third wavelength laser beam and the third frequency shifted laser beam and to direct the beams along the optical path toward the birefringent optical element portion, for which the birefringent optical element portion is configured to receive the third wavelength laser beam and the third frequency shifted laser beam and combine the beams to output the corresponding third combined beam with the first combined beam, wherein the first combined beam, the second combined beam and the third combined beam are configured to be utilized as part of a measurement process for determining a measurement distance to a surface point on a workpiece.

15. The heterodyne light source of claim 14, wherein the receiving optical element comprises an imaging lens, for which an object plane in the acousto-optic modulator is imaged into the birefringent optical element portion with a magnification that is matched to separation angles of both the acousto-optic modulator and the birefringent optical element portion.

16. The heterodyne light source of claim 14, wherein the receiving optical element portion comprises a plurality of imaging lenses forming a chromatic imaging system, for which the receiving optical element comprises at least one of the imaging lenses and an object plane in the acousto-optic modulator is imaged into the birefringent optical element portion with a magnification that is matched to separation angles of both the acousto-optic modulator and the birefringent optical element portion for both the first and second wavelengths of the first and second wavelength laser beams, respectively.

17. The heterodyne light source of claim 14, wherein the birefringent optical element comprises at least one of a birefringent beam displacer, a Wollaston prism, or a Rochon prism.

18. The heterodyne light source of claim 14, wherein the source optical arrangement including the receiving optical element portion and the birefringent optical element portion is arranged as an inline optical arrangement, for which the first wavelength laser beam and the first frequency shifted laser beam are orthogonally polarized and each travel through the receiving optical element of the receiving optical element portion and the birefringent optical element of the birefringent optical element portion, with the birefringent optical element combining the orthogonally polarized first wavelength laser beam and first frequency shifted laser beam into the first combined beam.

19. The heterodyne light source of claim 18, wherein;

the second wavelength laser beam and the second frequency shifted laser beam are orthogonally polarized and each travel through the receiving optical element of the receiving optical element portion and the birefringent optical element of the birefringent optical element portion, with the birefringent optical element combining the orthogonally polarized second wavelength laser beam and second frequency shifted laser beam into the second combined beam; and the third wavelength laser beam and the third frequency shifted laser beam are orthogonally polarized and each travel through the receiving optical element of the receiving optical element portion and the birefringent optical element of the birefringent optical element portion, with the birefringent optical element combining the orthogonally polarized third wavelength laser beam and third frequency shifted laser beam into the third combined beam.

* * * * *